(12) United States Patent
Mannon et al.

(10) Patent No.: US 10,431,105 B2
(45) Date of Patent: Oct. 1, 2019

(54) ENHANCED AWARENESS OF OBSTACLE PROXIMITY

(71) Applicant: Honeywell International Inc., Morristown, NJ (US)

(72) Inventors: Pamela Mannon, Snohomish, WA (US); Ratan Khatwa, Sammamish, WA (US)

(73) Assignee: Honeywell International Inc., Morris Plains, NJ (US)

( * ) Notice: Subject to any disclaimer, the term of this patent is extended or adjusted under 35 U.S.C. 154(b) by 489 days.

(21) Appl. No.: 14/149,619

(22) Filed: Jan. 7, 2014

(65) Prior Publication Data
US 2015/0194060 A1 Jul. 9, 2015

(51) Int. Cl.
*G08G 1/16* (2006.01)
*G06G 7/78* (2006.01)
(Continued)

(52) U.S. Cl.
CPC .............. *G08G 5/065* (2013.01); *G01S 7/062* (2013.01); *G01S 7/12* (2013.01); *G01S 7/22* (2013.01);
(Continued)

(58) Field of Classification Search
CPC .............. G01S 2013/9335; G01S 13/93; G01S 13/931; G01S 7/24; G01S 7/22;
(Continued)

(56) References Cited

U.S. PATENT DOCUMENTS 3,611,371 A * 10/1971 Morse .................. G01S 7/20 342/114
5,877,721 A * 3/1999 Tsang ................... G01S 7/292 342/36
(Continued)

FOREIGN PATENT DOCUMENTS

EP 1347412 A1 9/2003
EP 1835369 A2 9/2007
(Continued)

OTHER PUBLICATIONS

"G1000 Integrated Flight Deck Cockpit Reference Guide for the Cessna Nav III," Garmin Ltd., 190-00384-11 Rev. A., Jan. 2010, 230 pp.
(Continued)

*Primary Examiner* — Khoi H Tran
*Assistant Examiner* — Jorge O Peche
(74) *Attorney, Agent, or Firm* — Shumaker & Sieffert, P.A.

(57) ABSTRACT

In some examples, a ground obstacle detection system of an aircraft is configured to generate and display a graphical user interface (GUI) that includes a graphical representation of a detected obstacle with which the aircraft may collide during a ground operation and an indication of an area of unknown associated with the detected obstacle. Instead of, in addition to, a GUI that includes an indication of an area of unknown associated with an obstacle, in some examples, a ground obstacle detection system to generate a GUI that includes at least two windows that present different views of an aircraft. At least one of the windows may include a graphical representation of an obstacle that may not be visible in the view of another window.

20 Claims, 7 Drawing Sheets

(51) Int. Cl.
  *G08G 5/06* (2006.01)
  *G08G 5/00* (2006.01)
  *G06F 3/0481* (2013.01)
  *G01S 7/06* (2006.01)
  *G01S 7/12* (2006.01)
  *G01S 7/22* (2006.01)
  *G01S 7/24* (2006.01)
  *G01S 13/93* (2006.01)
  *G08G 5/04* (2006.01)
  *G01S 7/41* (2006.01)

(52) U.S. Cl.
  CPC .............. *G01S 7/24* (2013.01); *G01S 13/931* (2013.01); *G06F 3/0481* (2013.01); *G08G 5/0078* (2013.01); *G01S 7/414* (2013.01); *G01S 2013/9332* (2013.01); *G01S 2013/9335* (2013.01); *G08G 5/0021* (2013.01); *G08G 5/045* (2013.01)

(58) Field of Classification Search
  CPC . G01S 7/12; G01S 7/062; G01S 7/414; G01S 2013/9332; G08G 5/065; G08G 5/0078; G08G 5/0021; G08G 5/045; G06F 3/0481
  USPC ............................................... 701/3, 70, 301
  See application file for complete search history.

(56) References Cited

U.S. PATENT DOCUMENTS

| | | | | |
|---|---|---|---|---|
| 6,092,009 | A * | 7/2000 | Glover | G01O 5/005 340/970 |
| 6,222,464 | B1 * | 4/2001 | Tinkel | F41G 7/343 340/945 |
| 6,246,342 | B1 | 6/2001 | Vandevoorde et al. | |
| 6,405,975 | B1 | 6/2002 | Sankrithi et al. | |
| 6,957,130 | B1 * | 10/2005 | Horvath | G01C 23/00 340/945 |
| 7,205,928 | B1 * | 4/2007 | Sweet | G01S 13/953 342/26 B |
| 7,308,343 | B1 * | 12/2007 | Horvath | G01C 23/00 340/945 |
| 7,375,678 | B2 | 5/2008 | Feyereisen et al. | |
| 7,609,200 | B1 * | 10/2009 | Woodell | G01S 13/953 342/176 |
| 7,765,061 | B1 * | 7/2010 | Barber | G01C 23/00 701/436 |
| 7,868,785 | B1 | 1/2011 | Wang | |
| 7,930,078 | B2 * | 4/2011 | Sugiura | B60R 1/00 340/435 |
| 8,204,642 | B2 * | 6/2012 | Tanaka | B60G 17/0165 340/435 |
| 8,234,066 | B2 | 7/2012 | Wipplinger et al. | |
| 8,249,762 | B1 * | 8/2012 | Flotte | G01S 13/94 701/3 |
| 8,553,087 | B2 * | 10/2013 | Yanai | B60R 1/00 348/148 |
| 2003/0046025 | A1 * | 3/2003 | Jamieson | G01C 23/00 702/159 |
| 2004/0073368 | A1 * | 4/2004 | Gonzalez-Banos | G05D 1/12 701/301 |
| 2004/0178943 | A1 * | 9/2004 | Niv | G01S 13/50 342/29 |
| 2007/0050101 | A1 * | 3/2007 | Sacle | B64D 45/0015 701/11 |
| 2007/0053551 | A1 * | 3/2007 | Kubo | B60R 1/00 382/106 |
| 2007/0088491 | A1 * | 4/2007 | He | G01C 23/005 701/120 |
| 2007/0299611 | A1 * | 12/2007 | Winkler | G01C 23/005 701/301 |
| 2008/0062011 | A1 * | 3/2008 | Butler | G01S 3/783 340/961 |
| 2008/0316089 | A1 * | 12/2008 | Forgrieve | G01S 7/04 342/191 |
| 2009/0112464 | A1 * | 4/2009 | Belcher | G01C 21/165 701/414 |
| 2009/0143967 | A1 | 6/2009 | Lee et al. | |
| 2010/0106419 | A1 * | 4/2010 | Flotte | G08G 5/0021 701/301 |
| 2010/0201565 | A1 * | 8/2010 | Khatwa | G01S 7/062 342/26 B |
| 2010/0207845 | A1 * | 8/2010 | Pal | G01C 23/005 345/7 |
| 2011/0010082 | A1 * | 1/2011 | Wilson | G01C 23/00 701/532 |
| 2011/0087417 | A1 * | 4/2011 | Anderson | B60O 1/48 701/96 |
| 2012/0029738 | A1 * | 2/2012 | Brunetti | G08G 5/0078 701/11 |
| 2012/0200433 | A1 | 8/2012 | Glover et al. | |
| 2012/0268262 | A1 * | 10/2012 | Popovic | B60Q 9/008 340/438 |
| 2013/0010117 | A1 | 1/2013 | Miyoshi et al. | |
| 2013/0110323 | A1 * | 5/2013 | Knight | G01S 13/93 701/3 |
| 2013/0218467 | A1 * | 8/2013 | Ogawa | G08G 1/096827 701/533 |
| 2013/0321169 | A1 | 12/2013 | Bateman et al. | |
| 2013/0321176 | A1 | 12/2013 | Vasek et al. | |
| 2013/0321193 | A1 | 12/2013 | Vasek et al. | |
| 2013/0325245 | A1 | 12/2013 | Kolcarek et al. | |
| 2013/0325312 | A1 | 12/2013 | Khatwa et al. | |
| 2013/0332062 | A1 * | 12/2013 | Kreitmair-Steck | G01C 23/00 701/301 |
| 2014/0240313 | A1 * | 8/2014 | Varga | G06T 19/006 345/419 |
| 2015/0004590 | A1 * | 1/2015 | McKinney | G09B 5/02 434/350 |
| 2017/0371338 | A1 * | 12/2017 | Kamata | G05D 1/024 |
| 2019/0051191 | A1 * | 2/2019 | Mosher | G06K 9/0063 |

FOREIGN PATENT DOCUMENTS

| | | |
|---|---|---|
| EP | 2045133 A2 | 4/2009 |
| EP | 2182326 A1 | 5/2010 |
| EP | 2669706 A2 | 12/2013 |
| WO | 2013181334 A1 | 12/2013 |

OTHER PUBLICATIONS

U.S. Appl. No. 13/835,122, by Andrew F. Lamkin et al., filed Mar. 15, 2013.
U.S. Appl. No. 14/149,575, by Pamela Mannon et al., filed Jan. 7, 2014.
Office Action from U.S. Appl. No. 14/149,575, dated Mar. 16, 2016, 15 pp.
Response to the Communication pursuant to Rules 70(2) and 70a(2) EPC dated Jul. 13, 2015, from counterpart European Patent Application No. 15150207.7, filed Jan. 5, 2016, 18 pp. (The Response has the date "Jan. 5, 2015" on its face, but this is in error and it was filed on Jan. 5, 2016, as indicated on the Electronic Receipt.).
Request for Rehearing under 37 C.F.R. § 41.52 responsive to the Patent Trial and Appeal Board Decision dated Jul. 11, 2018, from U.S. Appl. No. 14/149,575, filed Sep. 10, 2018, 5 pp.
Advisory Action from U.S. Appl. No. 14/149,575, dated Dec. 14, 2016, 3 pp.
Pre-Appeal Brief Request for Review from U.S. Appl. No. 14/149,575, filed Dec. 14, 2016, 4 pp.
Reply Brief in response to Examiner's Answer dated Oct. 6, 2017 from U.S. Appl. No. 14/149,575, filed Dec. 6, 2017, 10 pp.
Examiner's Answer from U.S. Appl. No. 14/149,575, dated Oct. 6, 2017, 12 pp.
Response to Decision on Request for Rehearing dated Oct. 3, 2018, from U.S. Appl. No. 14/149,575, filed Nov. 30, 2018, 11 pp.
Final Office Action from U.S. Appl. No. 14/149,575, dated Sep. 8, 2016, 15 pp.

(56) References Cited

OTHER PUBLICATIONS

Response to Final Office Action dated Sep. 8, 2016, from U.S. Appl. No. 14/149,575, filed Nov. 8, 2016, 5 pp.
Ma et al., "A Real-Time Rear View Camera Based Obstacle Detection," Proceedings of the 12th International IEEE Conference on Intelligent Transportation Systems, Oct. 3-7, 2009, 6 pp.
Communication pursuant to Article 94(3) EPC dated Oct. 22, 2018, 10 pp.
Amendment and Response to Office Action dated Mar. 16, 2016, from U.S. Appl. No. 14/149,575, filed Jun. 16, 2016, 14 pp.
Appeal Brief filed in U.S. Appl. No. 14/149,575, filed Apr. 17, 2017, 34 pp.
Pre-Brief Appeal Conference Decision from U.S. Appl. No. 14/149,575, dated Mar. 17, 2017, 2 pp.
Patent Board Decision from U.S. Appl. No. 14/149,575, dated Jul. 11, 2018, 10 pp.
Extended Search Report from counterpart European Application No. 15150207.7, dated May 13, 2015, 9 pp.
Response to Office Action dated Feb. 1, 2019, from U.S. Appl. No. 14/149,575, filed Apr. 29, 2019, 14 pp.
Response to Extended Search Report dated Oct. 22, 2018, from counterpart European Application No. 15150207.7, filed Jan. 29, 2019, 12 pp.
Office Action from U.S. Appl. No. 14/149,575, dated Feb. 1, 2019, 17 pp.
Decision on Request for Rehearing from U.S. Appl. No. 14/149,575, dated Oct. 3, 2018, 5 pp.
Office Action from U.S. Appl. No. 14/149,575, dated May 22, 2019, 15 pp.

\* cited by examiner

ENHANCED AWARENESS OF OBSTACLE PROXIMITY

TECHNICAL FIELD

The disclosure relates to aircraft obstacle awareness, e.g., during ground operations by an aircraft.

BACKGROUND

During some ground operations of an aircraft, a flight crew maneuvers the aircraft to maintain separation between and aircraft and obstacles (e.g., other ground traffic or airport structures). The obstacles may be detected by the flight crew based on visual surveillance of the ground areas by the flight crew, based on information from Air Traffic Control, or both.

SUMMARY

The disclosure describes example ground obstacle detection systems configured to generate and display a graphical user interface (GUI) that includes information regarding one or more detected obstacles and methods for generating and displaying information regarding detected ground obstacles. In some examples, a ground obstacle detection system is configured to generate and display a GUI that includes a graphical representation of a detected obstacle with which the aircraft may collide during a ground operation and an indication of an area of unknown associated with the detected obstacle. The GUI can also include a graphical representation of an aircraft in some examples. The area of unknown can be, for example, an area (e.g., two-dimensional ground space or a volume of space) for which the ground obstacle detection system is unable to determine the presence or absence of a ground obstacle, e.g., due to limitations in the types of information with which the system detects obstacles. For example, the area of unknown can be a two-dimensional ground area or a volume of space that is blocked from the view of sensors onboard the aircraft by the detected obstacle, e.g., due to an inability to see through or around the detected obstacle.

Instead of, in addition to, a GUI that includes a graphical representation of a detected obstacle and an indication of an area of unknown, in some examples, a ground obstacle detection system is configured with a zoom function that enables a user to view different views of a graphical representation of an aircraft and ground area surrounding the aircraft. The different views can be, for example, different portions of the aircraft and/or ground area, different scaled views of the aircraft and/or ground area, or any combination thereof The different views can, but need not be, from the same perspective (e.g., a top plan view, a side plan view, a perspective view, and the like).

In these examples, the system is configured to generate a GUI that includes at least two windows that present different views of an aircraft. For example, at least two windows may illustrate the aircraft in different scales or may one window may illustrate a different portion of the aircraft than another window. In some examples, the processor may be configured to generate a GUI that includes a first graphical representation of an aircraft and, in response to receiving user input requesting a different view (e.g., a zoomed-in view of the aircraft), the processor may generate a second GUI including at least two windows that are displayed together, where the at least two windows illustrate different views of the aircraft and surrounding area. At least one of the windows may include a graphical representation of an obstacle that may not be visible in the view of another window.

In one aspect, the disclosure is directed to a method that comprises determining, by a processor, a location of an obstacle relative to an aircraft, and generating, by the processor, a graphical user interface based on the location of the obstacle, the graphical user interface comprising a graphical representation of the aircraft, a graphical representation of the obstacle, and an indication of the area of unknown associated with the obstacle.

In another aspect, the disclosure is directed to a system comprising a display, and a processor configured to receive information indicative of a location of an obstacle, determine the location of an obstacle relative to an aircraft based on the received information, generate a graphical user interface based on the location of the obstacle, the graphical user interface comprising a graphical representation of the aircraft, a graphical representation of the obstacle, and an indication of the area of unknown associated with the obstacle, and present the graphical user interface via the display.

In another aspect, the disclosure is directed to a computer-readable medium comprising instructions that, when executed by a processor, cause the processor to determine a location of an obstacle relative to an aircraft, and generate a graphical user interface based on the location of the obstacle, the graphical user interface comprising a graphical representation of the aircraft, a graphical representation of the obstacle, and an indication of the area of unknown associated with the obstacle.

In another aspect, the disclosure is directed to a system comprising means for determining a location of an obstacle relative to an aircraft, and means for generating a graphical user interface based on the location of the obstacle, the graphical user interface comprising a graphical representation of the aircraft, a graphical representation of the obstacle, and an indication of the area of unknown associated with the obstacle.

In another aspect, the disclosure is directed to a method comprising determining, by a processor, a location of an obstacle proximate an aircraft, and generating, by the processor, a graphical user interface based on the location of the obstacle, the graphical user interface comprising a first window including a first graphical representation of the aircraft, and a second window including a second graphical representation of the aircraft, the second graphical representation of the aircraft representing a different view of the aircraft than the first graphical representation, wherein at least one of the first or second windows includes a graphical representation of the detected obstacle.

In another aspect, the disclosure is directed to a system comprising a display, and a processor configured to determine a location of an obstacle proximate an aircraft, and generate a graphical user interface based on the location of the obstacle, the graphical user interface comprising a first window including a first graphical representation of the aircraft, and a second window including a second graphical representation of the aircraft, the second graphical representation of the aircraft representing a different view of the aircraft than the first graphical representation, wherein at least one of the first or second windows includes a graphical representation of the detected obstacle.

In another aspect, the disclosure is directed to a system comprising means for determining a location of an obstacle proximate an aircraft, and means for generating a graphical user interface based on the location of the obstacle, the graphical user interface comprising a first window including a first graphical representation of the aircraft, and a second window including a second graphical representation of the aircraft, the second graphical representation of the aircraft representing a different view of the aircraft than the first graphical representation, wherein at least one of the first or second windows includes a graphical representation of the detected obstacle.

In another aspect, the disclosure is directed to a computer-readable medium comprising instructions that, when executed by a processor, cause the processor to determine a location of an obstacle proximate an aircraft, and generate a graphical user interface based on the location of the obstacle, the graphical user interface comprising a first window including a first graphical representation of the aircraft, and a second window including a second graphical representation of the aircraft, the second graphical representation of the aircraft representing a different view of the aircraft than the first graphical representation, wherein at least one of the first or second windows includes a graphical representation of the detected obstacle.

In another aspect, the disclosure is directed to an article of manufacture comprising a computer-readable storage medium. The computer-readable storage medium comprises computer-readable instructions for execution by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory that stores instructions (e.g., in the form of a computer program or other executable) to cause a processor to perform the techniques described herein. The computer-readable medium is non-transitory in some examples.

The details of one or more examples are set forth in the accompanying drawings and the description below. Other features, objects, and advantages will be apparent from the description and drawings, and from the claims.

BRIEF DESCRIPTION OF DRAWINGS

FIGS. 7A-7C may be GUIs that are sequentially presented to indicate an updated location of a detected obstacle.

DETAILED DESCRIPTION

Figure 1:
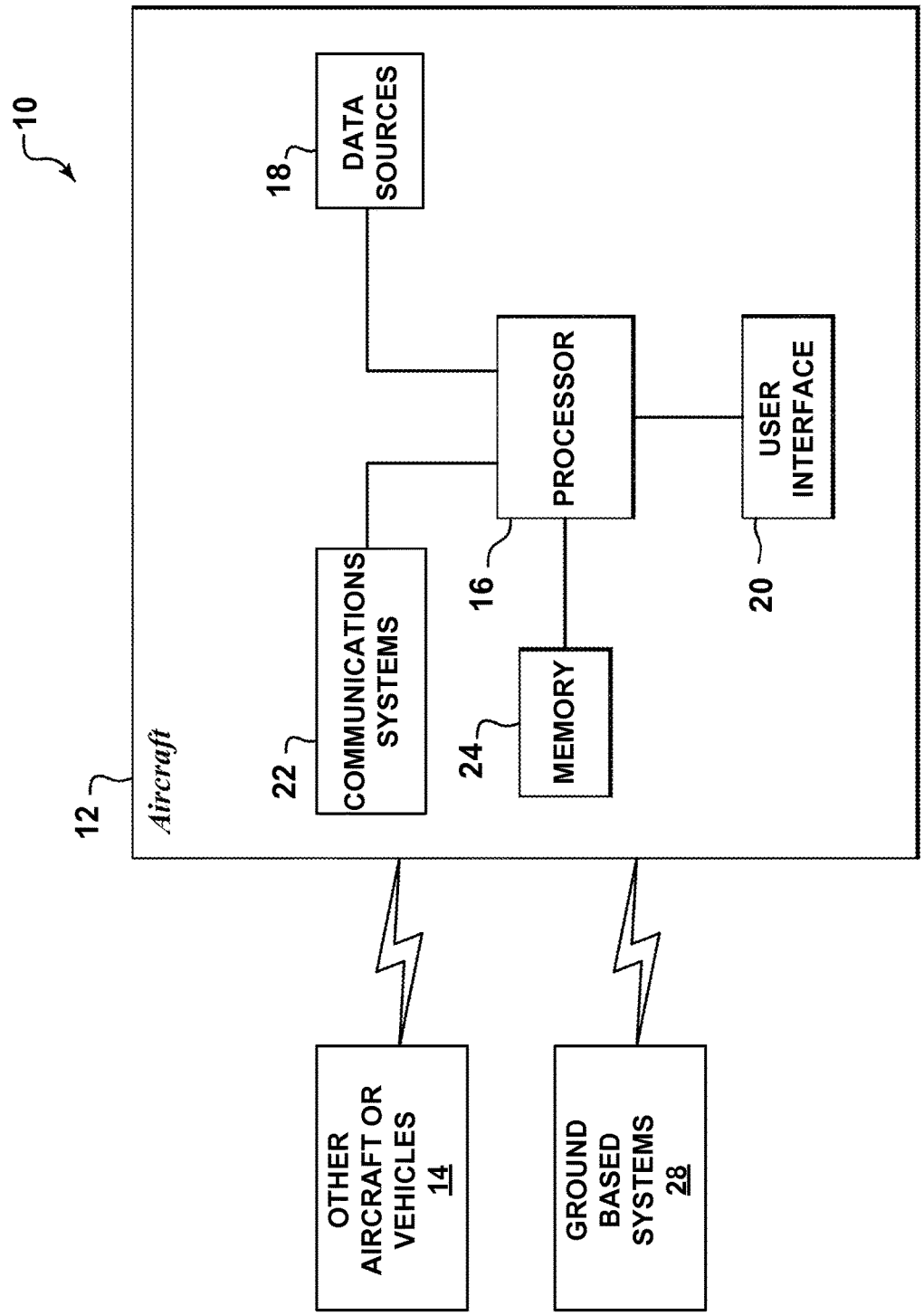
FIG. 1 is a block diagram illustrating an example ground obstacle detection system of an aircraft.

A ground obstacle detection system can be used during ground operations to help an aircraft flight crew stay apprised of obstacles with which the aircraft may collide during the ground operations (e.g., during taxiing). The obstacles can include, for example, another aircraft, a ground vehicle, an airport structure, or another object. In some examples described herein, a ground obstacle detection system includes one or more sources of information regarding the presence of an obstacle proximate an aircraft (e.g., sensors placed at various locations around the aircraft, such as at the wingtips), a user interface, and a processor configured to receive the information, detect an obstacle based on the information, and control the user interface to present information regarding the detected obstacle in response to detecting the obstacle. The user interface is configured to present information to the aircraft crew, which may be onboard the aircraft or remotely located. The user interface can include any suitable human-machine interface, such as a head-up display, a head-down display, or a head-mounted display.

An aircraft flight crew maneuvering an aircraft on the ground, e.g., as an aircraft taxis from a runway to a gate at an airport, may have difficulty being aware of obstacles proximate the aircraft. The difficulty may arise in part due to limited visibility caused by the relatively large size of the aircraft, and due to potential distractions, such as other moving vehicles on the ground, or such as other taxiway maneuvers and related operations being performed by the aircraft crew. For example, due to the size of the aircraft, the flight crew may be unaware of obstacles near the wing-tips or the tail of the aircraft. The ground obstacle detection systems described herein may help reduce the number, severity, or both, of inadvertent collisions of the aircraft with obstacles while the aircraft is on the ground by helping the flight crew stay apprised of obstacles that may be near the aircraft. The ground obstacle detection systems described herein include features that help enhance the awareness of a flight crew to the proximity of obstacles to an aircraft.

In some examples, a ground obstacle detection system is configured to generate and display a GUI that includes a graphical representation of a detected obstacle and an indication of an area of unknown associated with the detected obstacle. The GUI can also include a graphical representation of an aircraft in some examples, which may provide context for the location of the detected obstacle and the area of unknown relative to the aircraft. The area of unknown can represent an area of space (e.g., a two-dimension area on the ground or a volume of space) for which the ground obstacle detection system is unable to determine the presence or absence of an obstacle, e.g., due to limitations in the types of information with which the system detects obstacles. For example, the area of unknown can be a two-dimension ground area or a volume of space that is blocked from view by sensors onboard the aircraft by the detected obstacle, e.g., due to an inability to see through or around the detected obstacle. In this way, the area of unknown can be associated with a detected obstacle.

The display of the graphical representation of a detected obstacle and an indication of an area of unknown associated with the detected obstacle may help improve crewmember awareness of obstacles. For example, providing an indication of an area of unknown may help the flight crew maneuver the aircraft to avoid the obstacle and any potential obstacles in the area of unknown, adjusting the current aircraft speed, direction, or both to help avoid any potential obstacles in the area of unknown, and to evaluate if a particular obstacle is a threat, e.g., if the aircraft may potentially collide with the obstacle.

Instead of, in addition to, a GUI that includes a graphical representation of a detected obstacle and an indication of an area of unknown, in some examples, a ground obstacle detection system is configured with a zoom function that enables a user to view different views of a graphical representation of an aircraft and ground area surrounding the aircraft. The different views may be displayed simultaneously so that, e.g., a user is able to inspect both an expanded area associated with the aircraft and a zoomed area associated with an obstacle and a portion of the aircraft. The different views can be, for example, different portions of the graphical representation of the aircraft and/or ground area, different scales of the graphical representation of the aircraft and/or ground area, or any combination thereof. The different views can, but need not be, from the same perspective (e.g., a top plan view, a side plan view, a perspective view, and the like). The scale can be, for example, a ratio of a dimension e.g., length) of the graphical representation of the aircraft and surrounding ground area to the same dimension of the real-life aircraft and ground area.

The ground obstacle detection system can be configured to generate and present a GUI including a zoomed-in view or a zoomed-out view of an aircraft (displayed as a graphical representation) in response to user input requesting the zoomed-in or zoomed-out view of the aircraft. A zoomed-in view may illustrate the aircraft 12 in a larger scale, greater detail, or both, or may illustrate only a portion of the aircraft in larger scale, greater detail, or both. In the zoomed-in view, less ground area surrounding the aircraft may be visible, due to the graphical representation of the aircraft occupying a larger percentage of the display and less ground area proximate the aircraft being displayed. While viewing a larger scale of the aircraft or a portion of the aircraft may be useful, it may also be useful to view areas that are not shown in the GUI with the zoomed-in view of the aircraft. For example, it may be useful for a user to view obstacles that may be in the ground area proximate the aircraft that is not shown in the GUI, but may still be a threat to the aircraft. These obstacles may be referred to as "off screen" obstacles. As another example, it may be useful for the user to view ground areas proximate the aircraft but not shown in the zoomed-in view in order to confirm that no obstacles are proximate the aircraft.

In some examples, ground obstacle detection system is configured to generate a GUI that includes at least two windows simultaneously, each of which illustrates different views of the aircraft and different areas surrounding the aircraft. In some examples, at least one windows of the GUI includes a graphical representation of the aircraft that represents a different portion of the aircraft and a different portion of the ground area surrounding the aircraft than another window. In addition to, or instead of, the different portion, in some examples, at least one windows of the GUI includes a graphical representation of the aircraft and ground area surrounding the aircraft that has a different scale than another window. At least one of the windows may illustrate an obstacle proximate the aircraft that may not be visible in the view of another window. In this way, the at least two windows may present information with which a user may stay apprised of off screen obstacles, or be apprised of the absence of any off screen obstacles.

For example, the processor may be configured to generate a GUI that includes a first graphical representation of an aircraft and, in response to receiving user input requesting a zoomed-in view of the aircraft, the processor may generate a second GUI. The second GUI including the zoomed-in view of the aircraft can, in some examples, include at least two windows that are displayed together, where a first window includes a first graphical representation of the aircraft representing the zoomed-in view requested by the user, and a second window includes a second graphical representation of the aircraft representing a different view of the aircraft and a different portion of the ground area than that shown in the first window. The first and second graphical representations of the aircraft represent different views of the aircraft, but may illustrate at least some overlapping portions of the aircraft, overlapping areas surrounding the aircraft (also referred to herein as "overlapping ground areas"), or both. Although two different graphical representations are shown and described herein, in other cases, additional graphical representations (e.g., three or more windows with different sized representations of overlapping areas) could be simultaneously displayed and controlled. The size, shape, and number of different graphical windows may be selectable and configurable in some examples.

At least one of the windows of the second GUI can also include a graphical representation of an obstacle. In some cases, depending on the proximity of an obstacle to the aircraft, a graphical representation of the obstacle may not be visible in a certain zoomed-in views of the aircraft. Thus, it may be beneficial for the GUI to include at least two windows illustrating different areas surrounding the aircraft. In this way, the GUI may provide the flight crew with a more enhanced awareness of obstacles and amore complete view of ground areas around the aircraft, which may not be seen if the GUI includes only one graphical representation of the aircraft at a scale in which the obstacle falls outside of the range of the ground area presented by the GUI.

In any of the examples described herein, the GUI generated and displayed by the ground obstacle detection system can present the graphical representation of a detected obstacle such that the relative distance between the detected obstacle and the aircraft (e.g., a specific portion of the aircraft, such as a wingtip) is shown to scale. The processor may, for example, scale the size of the obstacles displayed and the representation of the aircraft displayed in response to user input indicating a particular zoom level. This range scaling and identification of obstacles on the display may help improve the accuracy, perception and resolution of obstacles presented on the display. In other examples, however, the GUI can represent the graphical representation of a detected obstacle to be a generic size that is not indicative of the actual size of the real world obstacle corresponding to the graphical representation.

In any of the examples described herein, a ground obstacle detection system can generate a GUI in which a detected obstacle is displayed to indicate a threat level to the aircraft, which is a function of the possibility the aircraft will collide with the detected obstacle. The ground obstacle detection system can determine the threat level based on the proximity of the detected obstacle to the aircraft, based on the location of the detected obstacle relative to the aircraft, based on the heading of the aircraft, based on the speed of the aircraft, or any combination thereof.

For example, the GUI can display a detected obstacle such that the relative distance between the detected obstacle and the aircraft is discernible by a user from viewing the GUI. For example, the graphical representation of the detected obstacle displayed via the GUI can include one or more characteristics that indicate a relative distance between the detected obstacle and the aircraft. Examples of characteristics include visible indicia such as, but not limited to, a color, shading of a displayed object, a line pattern used to define or fill the displayed object, and the like. As another example, the GUI can include a ruler or other tool from which a user may relatively quickly gauge the approximate distance between the aircraft and the detected obstacle.

In some examples, the ground obstacle detection system described herein may be used in conjunction with a ground obstacle collision alert system, which may be configured to generate and deliver, via a user interface, a ground obstacle collision alert indicative of a ground obstacle collision condition, which can include, for example, a condition in which there is a potential for a collision between the aircraft and an obstacle while the aircraft is on the ground, e.g., due to the distance between the aircraft and the obstacle, due to the velocity and direction of the aircraft relative to the obstacle, or any combination thereof. The ground obstacle collision alert may be audible, visual, somatosensory, or any combination thereof.

FIG. 1 is a block diagram illustrating an example ground obstacle detection system 10, which is configured to detect one or more obstacles proximate aircraft 12 and present information to a flight crew (e.g., a pilot) regarding the detected one or more obstacles. The obstacle can be, for example, another aircraft, a ground vehicle, an airport structure, or another object with which aircraft 12 may collide with during a ground operation.

In the example shown in FIG. 1, system 10 includes processor 16, one or more data sources 18, user interface 20, communications system 22, and memory 24. A portion of system 10 or the entire system 10 can be located on an aircraft 12. For example, in the example shown in FIG. 1, processor 16, data sources 18, user interface 20, communications system 22, and memory 24 are onboard aircraft 12.

In other examples, a portion of system 10 may be located external to aircraft 12, such as in an air traffic control center or another ground control center. For example, a processor may be located external to aircraft 12 and may perform any part of the functions attributed to processor 16 herein. For example, the processor located external to aircraft 12 may be configured to detect one or more obstacles based on data received from data sources 18 onboard aircraft 12, as well as data sources (e.g., other aircraft 14 or ground-based systems 28, or both) external to aircraft 12, and control user interface 20 onboard aircraft 12 to present information regarding the detected obstacle. The processor located external to aircraft 12 may, for example, be configured to transmit a control signal to processor 16 onboard aircraft 12 via communications system 22.

Processor 16, as well as other processors disclosed herein, can comprise any suitable arrangement of hardware, software, firmware, or any combination thereof, to perform the techniques attributed to processor 16 herein. For example, processor 16 may include any one or more microprocessors, digital signal processors (DSPs), application specific integrated circuits (ASICs), field programmable gate arrays (FPGAs), or any other equivalent integrated or discrete logic circuitry, as well as any combinations of such components. Memory 24 includes any volatile or non-volatile media, such as a random access memory (RAM), read only memory (ROM), non-volatile RAM (NVRAM), electrically erasable programmable ROM (EEPROM), flash memory, and the like. Memory 24 may store computer readable instructions that, when executed by processor 16, cause processor 16 to perform the techniques attributed to processor 16 herein.

User interface 20 is configured to present information regarding one or more detected obstacles to a user, who may be a part of a crew in a cockpit of aircraft 12 or may be located remotely from aircraft 12. User interface 20 includes a display, which can be, for example, one or more of a liquid crystal display (LCD) or a light emitting diode (LED) display configured to present visual information to the user. The display can be provided by any suitable device, such as, for example, one or more of a tablet computing device, an electronic flight bag (EFB), a primary flight display (PFD), a multifunction display (MFD), a navigation display, or any other suitable display. The display can be a head-up display, a head-down display, or a head-mounted display.

In addition, in some examples, user interface 20 includes a speaker configured to deliver audible information, a sensory device configured to deliver information via a somatosensory alert, or any combination thereof. User interface 20 is configured to receive input from a user. For example, user interface 20 can include one or more of a keypad, buttons, a peripheral pointing device or another input mechanism that allows the user to provide input. The buttons may be dedicated to performing a certain function, e.g., receiving user input indicative of a specific type of input, or the buttons and the keypad may be soft keys that change in function depending upon the section of a display currently viewed by the user. In some examples, the display of user interface 20 may be a touch screen display configured to receive the input from a user.

Processor 16 is configured to send and receive information over a data channel via communications system 22, which may include a transponder, a transmitter, a transponder, or any combination thereof. For example, processor 16 may be configured to send, receive, or both send and receive data from data sources external to aircraft 12, such as from other vehicles 14 and ground-based systems 28. The data received by processor 16 can include, for example, information indicative of obstacles proximate aircraft 12. Examples of data that can be received from sources external to aircraft 12. include, but are not limited to, data indicating the position and, in some cases, the velocity, of other aircraft on the ground, such as automatic dependent surveillance-broadcast or broadcast/traffic information service-broadcast (ADS-B/TIS-B) data received from other aircraft or ground vehicles, data transmitted by an airport or airline and indicating the position of other vehicles/aircraft/obstacles (e.g., received by aircraft 12 via a Worldwide Interoperability for Microwave Access (WiMAX)), or any combination thereof.

ADS-B data can provide information regarding not only the relative location of another aircraft or ground vehicle, but also aircraft or vehicle type data. In some examples, memory 24 or another memory (e.g., onboard aircraft 12 or external to aircraft) stores a database that provides geometry for different types of aircraft. Thus, in some examples, based on ADS-B data received by processor 16, processor 16 can determine the size of a detected obstacle relative to aircraft 12.

Processor 16 is also configured to receive data from, and, in some cases, control, one or more data sources 18 onboard aircraft 12. The communicative coupling between processor 16 and one more data sources 18 may be, for example, a data bus, a direct connection, or any other wired or wireless communication interface. The input from data sources 18 may also be stored in memory 24 in some examples. Different input may be stored in memory 24 so as to define different types of Obstacles or different types of input, and processor 16 may be configured to interpret data in memory 24 as being indicative of different obstacles or input. Memory may implement a mapping scheme (e.g., a table) for efficiently storing information from data sources 18 and processor 16 may be configured to understand the mapping scheme used by memory 18 so that data in memory 18 can be interpreted as the input that was received from data sources 18.

One or more data sources 18 are configured to generate information with which processor 16 may detect an obstacle, e.g., a ground obstacle. Thus, processor 16 may receive information from one or more data sources (in addition to or instead of from other aircraft or vehicles 14 or ground-based systems 28), and detect an obstacle proximate aircraft 12 based on the received information. For example, one or more data sources 18 may be configured to generate data indicative of a location of aircraft 12 and processor 16 can be configured to detect an obstacle based on the location of aircraft 12. In these examples, one or more data sources 18 may include GPS, inertial navigation system (INS), or another positioning system configured to indicate the location of aircraft 12. The location of aircraft 12 indicated by the data from one or more data sources 18 may be the geographic location (e.g., latitude and longitude) of aircraft 12, the location of aircraft 12 relative to one or more landmarks, or any combination thereof.

In some examples, one or more data sources 18 also include a maps database, which stores a plurality of maps that indicate the location (e.g., by global coordinates) of ground structures, such as airport buildings, towers, and the like on the airport ground surface. Processor 16 can detect an obstacle based on, for example, the location of aircraft 12 indicted by the one or more data sources 18 and the maps database, e.g., by at least determining whether the current location of aircraft 12 is proximate a structure indicated by the maps database.

In addition, or instead of, the positioning system and maps database, in some examples, one or more data sources 18 include other sensors configured to generate information indicative of Obstacles near aircraft 12 (e.g., surrounding aircraft, buildings or other structures, ground vehicles, ground crew, and the like). For example, the sensors may be a part of a synthetic vision system/enhanced vision system/ combined vision system (SVS/EVS/CVS) of aircraft 12. Sensors of data sources 18 configured to generate information about obstacles near aircraft 12 can include one or more active sensors (e.g., one or more radar sensors), one or more passive sensors (e.g., one or more cameras), or any combination thereof. The sensors may be located at any suitable place on aircraft 12. For example, in some examples, if the sensors include radar sensors or cameras, the radar sensors or cameras can be located on tips of the wings of aircraft 12 and oriented along a horizontal plane to detect the presence of objects at the same height of the wings. In addition, the sensors may be oriented in any suitable direction for detecting ground obstacles.

The fields of view (FOVs) of the sensors can be selected such that sensors help provide a crew of aircraft 12 stay apprised of obstacles proximate aircraft 12, such as near the wings and tail of aircraft 12. In addition, the sensors can have any sensor range suitable for providing the pilot with advanced notice of obstacles, e.g., with enough time to maneuver aircraft 12 on the ground to avoid the detected obstacles.

In some examples, the one or more sensors of data sources 18 include one or more radar sensors, which are each configured to generate and emit a radar pulse and detect a radar return pulse. The radar return pulse is generated by reflected energy from an object upon which the emitted radar pulse is incident on, where the object can be obstacles (e.g., ground objects) in an area of interest about aircraft 12. The radar sensor can include an antenna (e.g., a stationary antenna or an antenna that may be moved to sweep an area of interest) configured to receive the radar return pulses, Processor 16 can be configured to detect obstacles and determine the location (e.g., global coordinates or location relative to aircraft 12) of obstacles based on the radar return pulses. The location can be, for example, both a distance and angular location relative to aircraft 12. The one or more radar sensors can include, for example, any suitable radar sensors, such as, but not limited to, radar sensors used in a weather radar system of aircraft 12 or radar sensors dedicated to detecting ground obstacles near aircraft 12.

In some examples, the one or more sensors of data sources 18 include one or more cameras. Processor 16 may be configured to receive images captured by the one or more cameras and process the images based on light emitted by a light on aircraft 12, by light emitted by other lamps or emitted from other lighting fixtures, or from ambient light to detect obstacles and, in some examples, determine the location of detected obstacles by at least identifying ranges from ground obstacles that aircraft 12 may potentially collide with.

Processor 16 may be configured to receive information via one or more of communications system 22 and data sources 18, detect an obstacle based on the received information, generate a GUI presenting information about the detected obstacle, and control user interface 20 to present the GUI. The obstacle can be, for example, an obstacle on the ground, such as a grounded aircraft, an airport structure, a ground vehicle, or other object within a potential strike zone of aircraft 12. Processor 16 can detect an obstacle using any suitable technique, such as in response to detecting an object within a particular distance range of aircraft 12, an obstacle is in the pathway of aircraft 12, which may be determined based on the heading and speed of aircraft 12 indicated by data sources 18, or any combination thereof.

In accordance with example devices, systems, and techniques described in U.S. patent application Ser. No. 13/835, 122 by Lamkin et al, data sources 18 can include a plurality of radar sensor modules each including a radar emitter and a detector device. Each radar sensor module is configured to emit, via the respective radar emitter, radar signals, receive, at the respective detector device, radar return signals corresponding to reflections of the emitted signal from a ground obstacle, and transmit radar information associated with the received radar signal reflections reflected from the ground obstacle. Each of the plurality of radar sensor modules can be uniquely located on a surface of aircraft 12 that is at risk for collision with a ground obstacle if the aircraft is moving (e.g., on wing tips, tail, vertical stabilizer, cowlings of the aircraft engines, or any combination thereof). Processor 16 can receive the radar return signals from the radar sensor modules, identify locations of ground obstacles in proximity to aircraft 12 based on the radar return signals (e.g., within a predetermined distance threshold of aircraft 12). Processor 16 can generate a GUI that includes a graphical representation of aircraft 12 and a graphical representation of a detected ground obstacle.

In addition to, or instead of, the techniques described above, processor 16 may be configured to implement one or more ground obstacle detection techniques described in commonly-assigned U.S. patent application Ser. No. 13/710, 400 by Bateman et al., which is entitled, "AIRPORT SURFACE COLLISION-AVOIDANCE SYSTEM (ASCAS)" and was filed on Dec. 10, 2012, the entire content of which is incorporated herein by reference. In addition, aircraft 12 may include any devices and systems described in U.S. patent application Ser. No. 13/710,400 by Bateman et al.

U.S. patent application Ser. No. 13/710,400 by Bateman et al. discloses an airport surface collision-avoidance system (ASCAS) that includes a plurality of sensors (e.g., one or more active sensors, such as radar, one or more passive sensors, such as a camera, or both) within aircraft light modules. Based on information from these sensors, processor 16 may detect and track obstacles, evaluate and prioritize threats, and declare and determine collision-avoidance actions. The ASCAS is configured to help avoid collisions on the airport surface (e.g., during taxiing clear of airport buildings, during taxiing close to airport buildings, during gate operations), between aircraft 12 and any type of obstacle (e.g., another aircraft, airport building, and ground service equipment), during all visibility conditions, for any type of collision (e.g., a collision with an object and an aircraft wingtip, tail assembly, engine cowl, fuselage, door, or any combination thereof), and while aircraft 12 is under its own power or receives power from an external device.

Processor 16 may be configured to generate and display a GUI (via a display of user interface 20) that displays graphical representations of one or more obstacles detected based on input from one or more of data sources 18, other aircraft or vehicles 14, ground-based systems 28, or other received information. As discussed with respect to FIGS. 2, 3A, and 3B, in some examples, processor 16 can generate a GUI that includes a graphical representation of a detected obstacle and an indication of an area of unknown associated with the detected obstacle. The GUI can also include a situational display of detected ground obstacles, status of the ground obstacles (e.g., the threat level of the obstacle), or both. For example, the GUI can include a graphical representation of aircraft 12 (e.g., an outline of aircraft wingtips or tail, a conceptual illustration of aircraft 12, an image of aircraft 12, or any combination thereof) and a graphical representation of one or more detected ground obstacles, which may be visually represented (e.g., using the color or fill pattern of the displayed obstacles) so as to a highlight any potential ground obstacle collision conditions.

In addition, or instead, as discussed with respect to FIGS. 4-7C, in some examples, processor 16 is configured to provide a zoom function. In these examples, processor 16 is configured to generate and present multiple GUIs that present different views of a graphical representation of an aircraft and the ground area surrounding the aircraft. In some cases, e.g., depending on the level of zoom, processor 16 generates and displays a GUI that includes at least two windows, at least two of which include graphical representations of aircraft 12 illustrating different views of aircraft 12 and different areas surrounding aircraft 12. For example, at least two windows of the GUI may illustrate different portions of the aircraft, different scales of the aircraft, different areas surrounding the aircraft, or any combination thereof. At least one of the windows may illustrate an obstacle proximate the aircraft that may not be visible in the view of another window.

Panning functions may also be supported, e.g., so that a user is able to pan up-down or side-to-side of any view according to a coordinate system (e.g., an x-y, x-z, or y-z coordinate system or an coordinate system). In this way, a user may be able to select the size and area of a first zoomed window that shows the object and a portion of the aircraft, relative to simultaneously-displayed second window that shows the entire aircraft and the obstacle.

Figure 2:
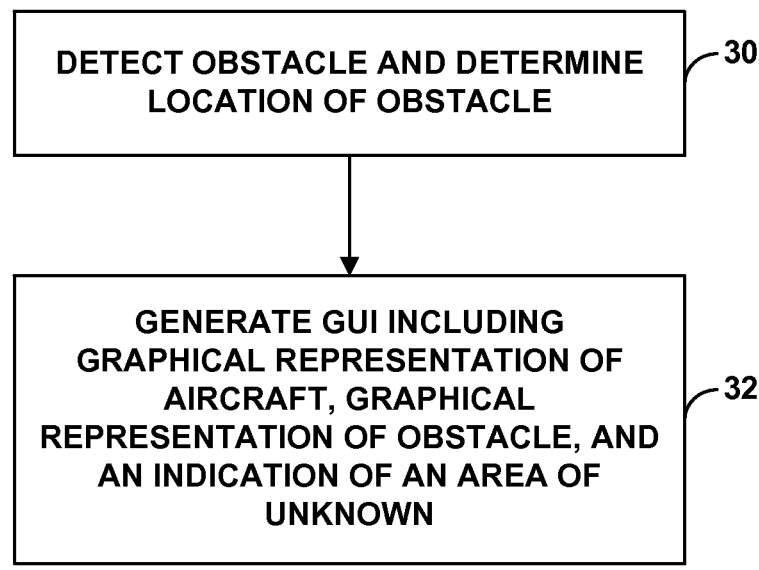
FIG. 2 is a flow diagram of an example technique for generating and displaying a GUI that includes a graphical representation of a detected obstacle and an indication of an area of unknown associated with the detected obstacle.
Figure 4:
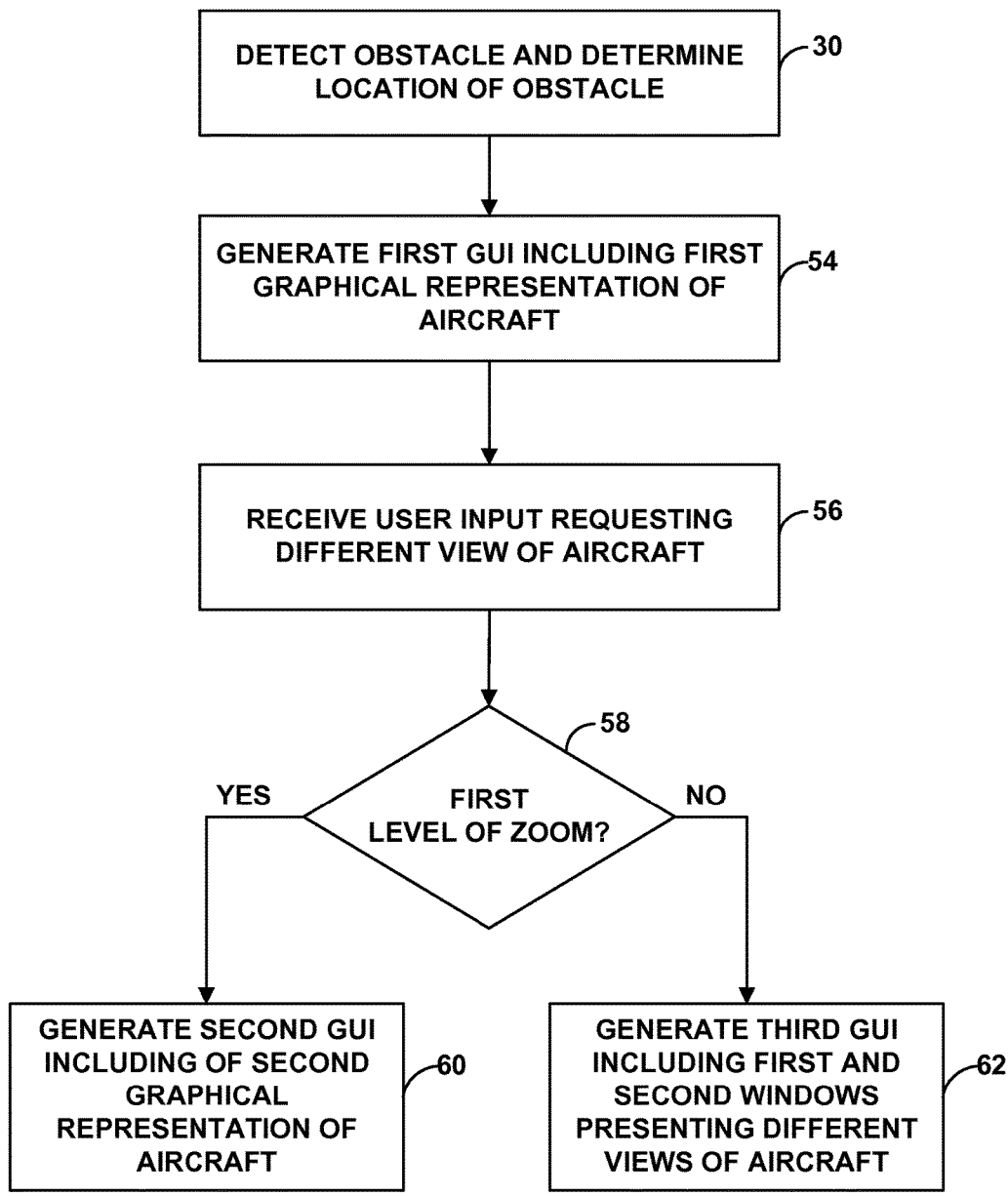
FIG. 4 is a flow diagram of a technique for generating and displaying a GUI that includes a plurality of windows, at least two of the windows illustrate different views of an aircraft, where at least one of the windows includes a graphical representation of a detected obstacle.

FIG. 2 is a flow diagram of an example technique for generating and displaying a GUI that includes a graphical representation of a detected obstacle and an indication of an area of unknown associated with the detected obstacle. While the technique shown in FIG. 2, as well as in FIG. 4, is primarily described with respect to processor 16 and ground obstacle detection system 10, in other examples, another processor can perform any part of the technique shown in FIGS. 2 and 4, as well as any other techniques described herein, alone or in combination with processor 16. The other processor can, but need not be, located onboard aircraft 12.

In accordance with the technique shown in FIG. 2, processor 16 detects an obstacle and determines the location of an obstacle proximate aircraft 12 (30). Processor 16 can detect an obstacle and determine the location using any suitable technique, such as, but not limited to, any one or more of the techniques described above, such as those described in U.S. Patent Application Publication No. 2012/0200433 by Glover et al., U.S. patent application Ser. No. 12/835,122 by Lamkin et al., and U.S. patent application Ser. No. 13/710,400 by Bateman et al.

For example, one or more data sources 18 can include a plurality of radar sensors distributed at different locations on aircraft 12, such as on the wing tips, the tail, and the engine nacelles. As described above, each radar sensor can be configured to generate and emit a radar pulse and detect a radar return pulse that is generated by reflected energy from an object upon which the emitted radar pulse is incident on. Processor 16 may receive one or more electrical signals indicative of the radar return pulses and detect the presence of an obstacle based on the one or more electrical signals, as well as determine the location of the detected obstacle based on the one or more electrical signals.

Processor 16 can determine the location of the detected obstacle by, for example, determining the distance between the obstacle (or at least one surface of the obstacle) and aircraft 12 based on the radar return pulses, determining global coordinates of the obstacle based on information from data sources 18 or information received via communications system 22 (FIG. 1), such as a map indicating global coordinates of airport structures, or any combination thereof.

In addition, processor 16 can be configured to determine not only the distance in one direction relative to aircraft (e.g., in the direction of the heading of aircraft 12), but also the angular position of the detected obstacle relative to a structure of aircraft 12 (e.g., the structure on which the sensor with which processor 16 detected the obstacle is positioned). Thus, in some examples, processor 16 is configured to determine a location of a detected obstacle based on a radial coordinate system, which may be determined relative to one or more fixed points on aircraft 12, which can be, for example, defined by the sensors with which processor 16 detects an obstacle. Processor 16 may, for example, implement techniques used by weather radar to determine the location of the detected obstacle.

Instead of, or in addition to radar returns (from sensors deployed on aircraft 12), processor 16 can detect obstacles and determine the location of the detected obstacles based on data from other aircraft or vehicles 14 (FIG. 1), ground-based systems 28 (FIG. 1), or both, as described above.

In some examples, processor 16 determines a threat level of a detected obstacle, e.g., based on the proximity to aircraft 12 (e.g., determined based on the lateral distance between the detected obstacle and aircraft 12, based on a height of the detected obstacle, or both), based on the heading of aircraft 12, based on a speed of aircraft 12 or any combination thereof. For example, processor 16 can characterize detected obstacles as one of primary targets, intermediate targets, and secondary targets, based on the proximity of the detected aircraft to aircraft 12. The characterization of a detected obstacle as one of these types of targets may indicate a threat level of the detected obstacle, e.g., as a function of the possibility aircraft 12 will collide with the detected obstacle.

In some examples, processor 16 determines a distance between aircraft 12 (e.g., a specific aircraft structure, such as a wing, wingtip or nacelle) and the detected obstacle (e.g., a direction in a direction parallel to the ground), and characterizes the detected obstacle as a primary, an intermediate, or a secondary obstacle based on the determined distance.

In other examples, in addition to, or instead of, distance to aircraft 12, processor 16 can use one or more other criteria to characterize a detected obstacle as a primary, an intermediate, or a secondary target. For example, in some examples, processor 16 determines a vertical height of a detected obstacle and characterizes the detected obstacle as a primary, an intermediate, or a secondary target based on the determined height of the detected obstacle, alone or in combination with the distance of the obstacle to aircraft 12. The vertical dimension is a direction substantially perpendicular to the aircraft heading and extends generally perpendicular to the ground.

The vertical height of a detected obstacle may indicate the threat level of the detected obstacle. If, for example, the detected obstacle is aligned with a wing of aircraft 12, but the height of the detected obstacle is lower than the height of the wing, processor 16 may characterize the detected obstacle as an intermediate or a secondary obstacle, even if the distance between the obstacle and aircraft 12 indicates the obstacle may be within a direct strike zone of aircraft 12, because the possibility of the wing colliding with the obstacle is relatively low due to the height of the obstacle. The vertical height of the obstacle may be conveyed by graphical elements in some examples, such as by using color. For example, an object that extends vertically to a small extent that does not cause concern may be identified in green, an object that extends vertically to an intermediate extent may be identified in yellow, and an object that extends vertically to an large extent (e.g., to a height that could collide with aircraft 12 or a specific structure of aircraft 12) may be identified in red. Other types of graphical identifications could also be used to identify height of any object in a top-view.

Memory 24 (FIG. 1) of aircraft 12 or another memory can store the parameters (e.g., vertical heights and lateral distances) with which processor 16 determines a threat level of a detected obstacle, e.g., the parameters with which processor 16 characterizes a detected obstacle as a primary, an intermediate, or a secondary target. In some examples, a primary target is an object on the ground within direct strike zone of a structure of aircraft 12, such as a wing, wingtip or nacelle. The direct zone is a zone in which the aircraft 12 will strike the obstacle if aircraft 12 continues on its current heading. In addition, in some examples, an intermediate target is an object on the ground located just outside the direct strike zone of a structure of aircraft 12, such as up to 10 feet or up to 3 meters laterally relative to the aircraft wing, where the lateral direction is in a direction substantially perpendicular to the heading of aircraft 12. In some examples, a secondary target is an object on the ground outside of the intermediate strike zone of a structure of aircraft 12, such as about greater than 10 feet or greater than 3 meters laterally relative to the aircraft wing, but within a predetermined distance from aircraft 12 in both lateral and vertical dimensions.

After processor 16 detects an obstacle and determines a location of the detected obstacle relative to aircraft 12 (30), processor 16 generates a GUI including a graphical representation of aircraft 12, a graphical representation of the detected obstacle, and an indication of an area of unknown (32). Processor 16 can present the generated GUI to a user via a display of user interface 20.

In some examples, the graphical representation of aircraft 12 is generic and does not represent the type of aircraft 12 for which the GUI is being displayed. In other examples, the graphical representation of aircraft 12 is indicative of the type of aircraft 12 and the graphical representation of aircraft 12 indicates the size, dimensions, and other characteristics of the actual aircraft 12. Processor 16 can, for example, select a graphical representation of aircraft 12 from memory 24 based on the type of aircraft 12.

The graphical representation of the detected obstacle generated by processor 16 may represent the presence of an obstacle at a particular location without indicating the type of obstacle that processor 16 detected. For example, the graphical representation of the detected obstacle may be a two-dimensional icon (e.g., in any suitable shape, such as a circle, a partial circle, a parallelogram, or a triangle) or a three-dimensional icon (e.g., in any suitable shape, such as a sphere, a partial sphere, a parallelepiped, or a pyramid). In some cases, however, such as when processor 16 detects an obstacle based on input from other aircraft 14, processor 16 may generate the GUI such that the detected obstacle is represented as another aircraft.

In addition, the graphical representation of the detected obstacle may not accurately represent the true size of the obstacle. This could be, for example, because of the size of the object is unknown due to the limitations of the data from which processor 16 detects the object (e.g., radar sensors or cameras). In sonic examples, the graphical representation of the detected obstacle generated by processor 16 may be the same for all detected obstacles. The graphical representation of the detected obstacle may, for example, represent only one surface or region of the detected obstacle, such as a corner of the detected obstacle.

In other examples, however, the graphical representation of the detected obstacle may represent the true size of the obstacle. For example, in examples in which processor 16 detects the obstacle using techniques identical or similar to those used for weather radars, processor 16 may determine the size of the portion of the detected obstacle facing aircraft 12 based on radar return pulses. For example, processor 16 may determine what portions of a two-dimensional grid of space is occupied by an obstacle using the radar return pulses. The portion of the detected obstacle facing aircraft 12 may be a projection of the portion of the aircraft facing aircraft 12, and, therefore, may be defined by a single surface or multiple surfaces of the obstacle.

In order to provide the flight crew with better awareness of potential obstacles, processor 16 generates a GUI including an indication of an area of unknown associated with a detected obstacle (32). As discussed above, an area of unknown associated with a detected obstacle can represent a two-dimension region of space or a volume of space for which processor 16 is unable to determine the presence or absence of an obstacle. Processor 16 may be unable to determine the presence or absence of an obstacle in a particular ground area due to limitations in the types of information from which processor 16 detects obstacles. For example, the area of unknown can be a volume of space that is blocked from view of radar sensors onboard aircraft 12 by the detected obstacle, e.g., due to an inability to transmit radar pulses through or around the detected obstacle. In some examples, the area of unknown associated with a detected obstacle is located on a side of the detected obstacle opposite the side of the obstacle on which aircraft 12 is positioned. This side of the obstacle opposite the side of the obstacle on which aircraft 12 is positioned may be referred to as a side "behind" the obstacle, which is obscured from view of aircraft 12 by the detected obstacle itself.

Processor 16 can determine an area of unknown associated with the detected obstacle using any suitable technique. In some examples, processor 16 determines the area of unknown for all detected obstacles. In other examples, however, processor 16 determines the area of unknown for only some articles. For example, processor 16 may determine an area of unknown based on the type of information with which processor 16 detected an obstacle. If, for example, processor 16 detected an obstacle (30) based on one or more radar sensors or cameras, processor 16 may determine that an area of unknown is associated with the obstacle. On the other hand, if processor 16 detected an obstacle (30) using the current location of aircraft 12 and a map indicating one or more airport structures, processor 16 may be able to determine the dimensions of the obstacle, and, therefore, there may not be an area of unknown associated with the obstacle.

Processor 16 can generate the indication of the area of unknown using any suitable technique. The indication of the area of unknown is configured to represent the orientation of the area of unknown relative to aircraft 12. The orientation of the area of unknown may depend on, for example, the heading of aircraft 12 on the ground.

In some examples, processor 16 selects a standard graphical object from memory 24 for the area of unknown, where the size and shape of the graphical Object is the same for all areas of unknown. In other examples, processor 16 selects a graphical object for the indication of an area of unknown from a plurality of graphical objects based on a characteristic of the detected obstacle. Each graphical object can have a different size, a different shape, or both a different size and shape. For example, processor 16 may determine a size of a portion of a detected obstacle detected by processor 16 (e.g., facing aircraft 12 in the case of a radar sensor or a camera) and select a graphical object based on the determined size of the portion of the detected obstacle. As an example, processor 16 may determine the width of the portion of a detected obstacle facing aircraft 12 and select a graphical object for the indication of an area of unknown that is associated with the width in memory 24 (FIG. 1) or another memory. The width may be measured in a direction substantially perpendicular to the heading of aircraft 12. The width may not be of a common surface of the detected obstacle, but, instead, may be the width of the projection of the portion of the obstacle facing aircraft 12. Each graphical object may be associated with a respective obstacle size range, where the size may be the width of the portion of a detected obstacle facing aircraft 12.

For example, in examples in which processor 16 detects an object using radar return pulses, processor 16 may be configured to determine that only a corner of the obstacle (whether it is a building, ground vehicle, or another obstacle) closest to aircraft 12 was detected. In this example, processor 16 can select, for the indication of the area of unknown, a two-dimensional triangular object, a three-dimensional wedge-shaped object, or another object that increases in width in a direction moving away from the graphical representation of the obstacle, where the object is oriented such that a vertex of the object (or a cross-section of the object in the case of a three-dimensional object) is positioned at the detected obstacle and the sides of the object project away from the obstacle in a direction away from the aircraft. Processor 16 can position the object relative to the graphical representation of aircraft 12 in the GUI such that a line representing the altitude of the triangular-shaped object or the altitude of a triangular cross-section of the three-dimensional object is aligned with a heading of aircraft 12.

As another example, if processor 16 detects an obstacle that has a relatively small width (e.g., a relatively skinny pole) in front of a wing of aircraft 12, processor 16 may select, for the indication of the area of unknown, a graphical object that is relatively narrow in width and position the object directly behind the detected obstacle in a direct line with a radar antenna on the wing of aircraft 12, which represents the area that the antenna cannot see. Processor 16 may know that the radar antenna cannot see (or "view") the area behind the obstacle because there is no reflectivity returns from behind the obstacle.

Other indications of an area of unknown may also be used in other examples. For example, processor 16 may be configured to determine that only a front surface of the obstacle (facing aircraft 12) closest to aircraft 12 was detected. In this example, processor can select a two-dimensional parallelogram-shaped object or a three-dimensional parallelepiped-shaped object for the graphical representation of the area of unknown, where the object is oriented such that the a tine or surface of the object aligns with the detected obstacle and the sides of the Object project away from the obstacle in a direction away from the aircraft. Processor 16 can position the object relative to the graphical representation of aircraft 12 in the GUI such that a centerline of the parallelogram-shaped object or a cross-section of a parallelepiped-shaped object is aligned with a heading of aircraft 12, the centerline extending substantially perpendicular (e.g., perpendicular or nearly perpendicular) from a center of a line or surface of the object aligned with the detected obstacle and away from the graphical representation of the obstacle.

Processor 16 positions the indication of the area of unknown in the GUI to represent the location of the area of unknown relative to the obstacle and aircraft 12. For example, processor 16 may position the indication of the area of unknown on an opposite side of the graphical representation of the obstacle from the graphical representation of aircraft 12.

In some examples, processor 16 generates the GUI such that the graphical representation of the detected obstacle, the indication of the area of unknown, or both, includes a characteristic that represents the threat level of the detected obstacle, area of unknown, or both, respectively. For example, for the graphical representation of the obstacle, the indication of the area of unknown, or both, processor 16 can select visible indicia (e.g., a particular color, shading, line pattern, or any combination thereof) from a plurality of available visible indicia based on the relative distance (e.g., lateral or vertical) between the detected obstacle and aircraft 12, Processor 16 may then generate and present the GUI including the graphical representation of the obstacle and the indication of the area of unknown including the visible indicia.

The plurality of available visible indicia can be, for example, organized according to a particular code in which a first indicia represents a first distance range to aircraft 12, a second indicia represents a second distance range to aircraft 12, and a third indicia represents a third distance range to aircraft 12. Any suitable number of distance ranges can be included in the code. As another example, the plurality of available visible indicia can be, for example, organized according to a code in which a first indicia represents a primary target, a second indicia represents an intermediate target, and a third indicia represents a secondary target. The flight crew may be educated in the represented types of targets and the associated threat levels.

Because the location of the area of unknown is based on the determined location of the detected obstacle (e.g., the locations may overlap or may be directly adjacent to each other in space), the relative lateral and/or vertical distance between the detected. obstacle and aircraft 12 may be a surrogate for the distance between the area of unknown and aircraft 12.

In some examples, processor 16 uses the same visible indicia to indicate the threat level of the detected obstacle, the area of unknown, or both, that is used by a weather radar system or Traffic Alert and Collision Avoidance System (TCAS) of aircraft 12. For example, a magenta color may represent a primary target, a yellow color may represent an intermediate target, and a cyan color may represent a secondary target. Using a color scheme similar or identical to the weather radar system of aircraft 12 may help increase the ease of use of ground obstacle detection system 10 by the flight crew of aircraft 12.

As described below, in some examples, the GUI generated by processor 16 can include other information, such as graphical indications of strike zones, distance markers, and the like.

Figure 3B:
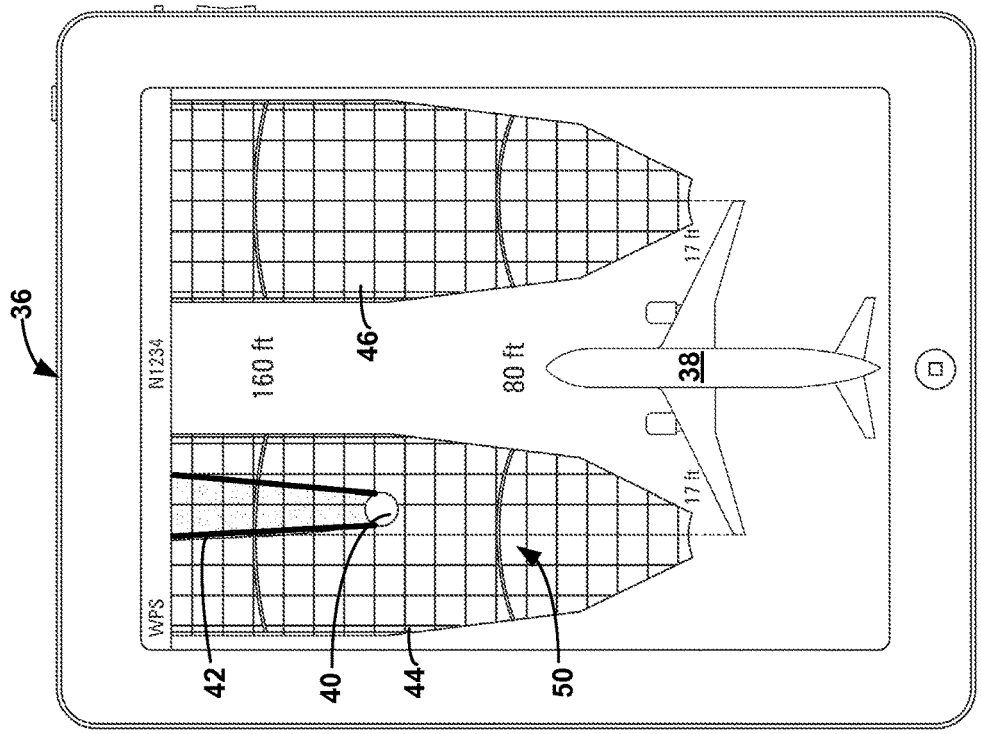
FIGS. 3A and 3B illustrate example GUIs that each includes a graphical representation of a detected obstacle, a graphical representation of an aircraft, and an indication of an area of unknown associated with the detected obstacle.
Figure 3A:
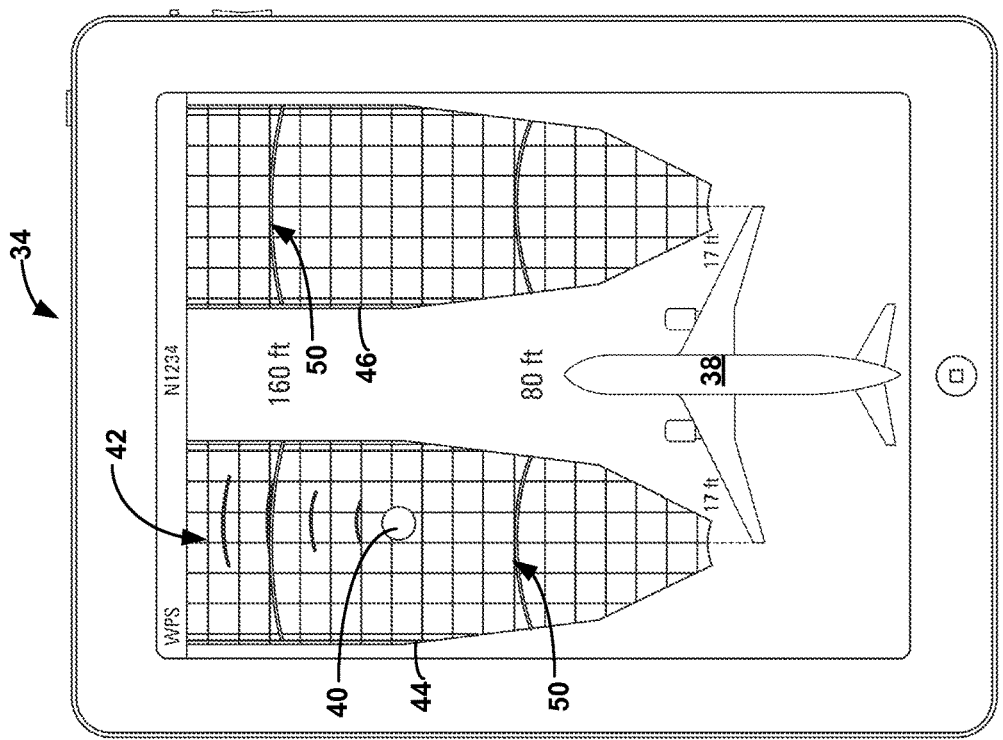

FIGS. 3A and 3B illustrate example GUIs 34, 36, respectively, that can be generated by processor 16, e.g., using the technique described with respect to FIG. 2. Processor 16 can present GUIs 34, 36 via a display of user interface 20.

GUI 34 shown in FIG. 3A includes graphical representation of aircraft 38, graphical representation of obstacle 40, and indication of area of unknown 42. GUI 34 also includes strike zone indications 44, 46, which represent the strike zone of the wings of aircraft 12. A strike zone can be, for example, a volume of space or a two-dimensional projection of the volume of space, in which the wings of aircraft 12 may collide with if aircraft 12 continues on its current heading. Thus, the shape of strike zone indications 44, 46 shown in GUI 34 provide guidance to a flight crew for identifying obstacles in the strike zone of the wings of aircraft 12.

In the examples shown in FIGS. 3A and 3B, the strike zone indications 44, 46 are visually indicated by an outline of the strike zone. Other strike zone indications can also be used. As shown in FIGS. 3A and 3B, a grid can also be overlaid over the strike zones to provide further guidance regarding the strike zones to a user viewing GUIs 34, 36.

Processor 16 can generate strike zone indications 44, 46 using any suitable technique. For example, processor 16 can select the strike zone indications 44, 46 based on a determined type of aircraft 12. In addition, in other examples, GUI 34 can include other strike zone indications, such as one or more strike zone indications that represent the strike zone of other structures of aircraft 12, such as the nacelle or rudder. Processor 16 can display these other strike zones in conjunction with the top plan view of aircraft 38 shown in FIG. 3A or in another view, such as a side view of aircraft 12 and the ground.

In some examples, as shown in FIG. 3A (as well as FIG. 3B), processor 16 generates a GUI 34 that includes distance markers that indicate the distance measured in a plane (e.g., substantially parallel to the ground, such as parallel to or nearly parallel to the ground) from a particular structure of aircraft 12. it the example shown in FIG. 3A, the distance markers indicate the distance from a fixed point on wings of aircraft 12. The distance markers can be, for example, one or more lines 50 and corresponding alphanumeric text indicating the distance of the line from the fixed point on aircraft, as shown in FIG. 3A. In the example shown in FIG. 3A, the borders of strike zones 44, 46 are determined based on a radial coordinate system, which can be defined relative to fixed points on each of the wings of aircraft 12. As a result, in the example shown in FIG. 3A, processor 16 generates distance markers that include radial lines.

The distance markers provide visual indicia with which a user may relatively quickly ascertain a threat level of a detected obstacle by viewing GUI 34 and to provide context fir a displayed obstacle 40.

Graphical representation of aircraft 38 presented by GUI 34 is a plan view of aircraft 12 representing a view looking down on aircraft 12 towards the ground. Processor 16 can generate GUIs including graphical representations of other views of aircraft 12, such as side views of aircraft 12, perspective views of aircraft 12, or any combination thereof.

Graphical representation of detected obstacle 40 displayed by GUI is a two-dimensional circle. As discussed above, in other examples, processor 16 can generate a GUI including a different graphical representation of detected obstacle 40, such as a three-dimensional object representing obstacle 40, a two-dimensional object having a different shape, or any combination thereof.

As discussed above, in some examples, processor 16 is configured to determine a location of a detected obstacle based on a radial coordinate system, which may be determined relative to one or more fixed points on aircraft 12, which can be, for example, on the two wings of aircraft 12. Thus, processor 16 can determine both the distance between aircraft 12 and a detected obstacle, as well as the angular direction of the detected obstacle relative to aircraft 12, and position graphical representation of detected obstacle 40 relative to graphical representation of aircraft 38 based on the determined distance and angular direction. In the example shown in FIG. 3A, GUI 34 displays obstacle 40 that is along a radial axis in front of a left wing of graphical representation of aircraft 38.

The graphical representation of detected obstacle 40 may not represent the entire obstacle. Instead, the displayed obstacle 40 may only represent a portion of a detected obstacle, such as a corner of an obstacle closest to aircraft 12. In order to provide a more meaningful awareness of Obstacles proximate aircraft 12, GUI 34 includes an indication of area of unknown 42 associated with the obstacle. The placement of indication of area of unknown 42 on a side of obstacle 40 opposite the graphical representation of aircraft 38 indicates to a user that a potential obstacle may be located on an opposite side of obstacle 40 than aircraft 12. Thus, aircraft 12 may not be free to maneuver directly behind obstacle 40 because the area behind obstacle 40 may be occupied by an obstacle.

In the example shown in FIG. 3A, the indication of the area of unknown 42 is illustrated as a plurality of arcs that propagate away from the displayed aircraft 38. The size of the arcs increase as the arcs propagate away from aircraft 38, thereby indicating the size of the determined size of unknown 42.

As discussed above, in some examples, processor 16 may generate GUI 34 such that the graphical representation of the detected obstacle 40, the indication of the area of unknown 42, or both, include a characteristic that represents the threat level of the detected obstacle, area of unknown, or both, respectively. For example, processor 16 can generate GUI 34 such that each arc of the plurality of arcs is displayed in a particular color that represents the threat level of detected obstacle 40. In some examples, the different arc lines of the graphical representation of the area of unknown 42 may have a different color, for example, if the area of unknown spans two different zones associated with different threat levels (e.g., the area of unknown spans both a zone defining a primary target and a zone defining an intermediate target).

Processor 16 can generate and display an area of unknown using any suitable graphical representation, FIG. 39 illustrates GUI 36 that is similar to GUI 34, but includes a graphical representation of area of unknown 48 that is a shaded region, rather than a plurality of arcs. In the example shown in FIG. 3B, the shape of the shaded region of area of unknown 48 widens (in a plane parallel to the ground) as it extends away from graphical representation of aircraft 38 to visually indicate the area (e.g. a two-dimensional area of the ground or a volume of space) for which processor 16 was unable to determine the presence or absence of an obstacle. As with area of unknown 42, in some examples, processor 16 generates GUI 36 such that area of unknown 48 is displayed with one or more visual indicia that indicate the threat level of area of unknown 48.

With the aid of GUIs 34, 36 including graphical representations of the areas of unknown 42, 48, processor 16 can present information regarding obstacles to a flight crew that indicates that ground obstacle detection system 10 is unable to determine the presence of obstacles in the areas of unknown. Thus, upon viewing one or both GUIs 34, 36, the flight crew may exercise vigilance prior to taxiing aircraft 12 in the area of unknown. In this way, a GUI including a graphical representation of one or more areas of unknown may help prevent a flight crew from maneuvering aircraft 12 to a ground position that may be difficult to get out of.

Although GUIs 34, 36 shown in FIGS. 3A and 3B each illustrates a single obstacle 40, in other examples, processor 16 can generate a GUI including any number of detected obstacles. For one or more of the detected obstacles, processor 16 can generate and present an indication of an area of unknown. In some examples, processor 16 generates and presents an indication of an area of unknown for each detected obstacle. In other examples, processor 16 generates and presents an indication of an area of unknown for only a subset of the detected obstacles, such as those determined to be primary targets, or for those detected obstacles determined to be primary or intermediate targets.

In some examples, ground obstacle detection system 10 is configured with a zoom function that enables a user to view different views of a graphical representation of an aircraft and ground area surrounding the aircraft. Depending on the level of zoom, it may be desirable for processor 16 to present both a graphical representation of aircraft 12 illustrating the view of aircraft 12 associated with user input, as well as additional information that indicates whether an obstacle may be proximate other portions of the aircraft 12 not represented by the view associated with the user input, or whether an obstacle may be in a ground area not displayed in the requested view of aircraft 12. In some examples, processor 16 provides this additional information via a GUI including at least two windows that include different graphical representations of aircraft 12 and the area surrounding aircraft 12. At least one of the windows may illustrate an obstacle proximate the aircraft that may not be visible in the scale or view of aircraft 12 shown in another window.

The at least two windows may, for example, illustrate aircraft 12 in different scales, or may illustrate different portions of aircraft 12. For example, a zoomed-in view of aircraft 12 may be presented in one window of the GUI and a zoomed-out view of aircraft may be presented in another window of the GUI. As another example, one wing of aircraft 12 and associated strike zone (the entire strike zone or a partial strike zone) may be presented in one window of the GUI and another wing of the aircraft and associated strike zone (the entire strike zone or a partial strike zone) may be presented in another window of the GUI. Other combinations of views can also be shown.

In some examples, processor 16 can be configured to generate the GUI that includes the at least two windows in response to receiving user input, e.g., requesting a view of a particular scale of aircraft 12. In other examples, processor 16 is configured to generate a GUI that includes the at least two windows in response to detecting an obstacle that is not visible in the view of aircraft 12 represented by the currently presented GUI.

FIG. 4 is a flow diagram of a technique for generating and displaying a GUI that includes a plurality of windows in response to receiving user input, at least two of the windows illustrate different views of aircraft 12. Processor 16 may detect an obstacle and determine the location of the detected obstacle (30), e.g., using the techniques described above with respect to FIG. 4.

Processor 16 generates a first GUI including a first graphical representation of aircraft 12 (54). In some examples, processor 16 is configured to, upon activation of ground obstacle detection system 10 by a user (e.g., in response to user input received via user interface 20) or automatically (e.g., in response to processor 16 detecting landing of aircraft 12 using data generated by other aircraft or vehicles 14, one or more data sources 18, ground-based systems 28, or any combination thereof), generate and display a first GUI that includes a particular graphical representation of aircraft 12, e.g., a representation of a top plan view of the entire aircraft. The first GUI may be, for example, an initial GUI displayed at start-up of ground obstacle detection system 10.

In some cases, the user (e.g., a pilot) may want to see a different view of aircraft 12 than that presented by the first GUI. The different view can be, for example, a zoomed-in view of a portion of aircraft 12 already presented by the first GUI, a different portion of the aircraft 12 than that presented by the first GUI, a zoomed-out view of aircraft 12, which may provide a different view of surrounding ground areas and obstacles coming up ahead of aircraft 12, and the like. Thus, the user may provide input via user interface 20 requesting a different view of aircraft 12, such as by directly interacting with a touch screen to zoom in or zoom out of the currently presented view of aircraft 12, by providing input via a key pad or buttons of user interface 20, by providing voice commands via a microphone of user interface 20, or by using any other suitable technique. Processor 16 receives the user input via the user interface 20 (56).

Processor 16 may be configured to generate and display graphical representations of aircraft 12 in any suitable number of zoom levels, where each zoom level is defined by the scale of the view of aircraft 12 requested by the user.

Each zoom level represents a particular magnification (e.g., increase in scale) of a baseline graphical representation of aircraft 12. For example, processor 16 can be configured to generate and display a graphical representation of aircraft 12 having two times to ten times, or two times to 100 times, the scale of a baseline graphical representation of aircraft 12. Other zoom levels can also be used.

Processor 16 may be configured to categorize the zoom requested by the user into a plurality of different zoom levels. In some examples, processor 16 is configured to generate and present a GUI that lists a predefined number of zoom levels, and the user may select one of the predefined zoom levels in order to provide the user input requesting a different view of aircraft 12. In addition to, or instead of, the predefined number of zoom levels, processor 16 can be configured to generate and display a GUI that is configured to permit a user to request any zoom level (e.g., by providing input manually resizing the displayed graphical representation of aircraft 12). This may be referred to as a continuous zoom.

In other examples, system 10 is configured such that the user may provide input selecting a zoom level using another mechanism, such as a flight deck control (e.g., a control knob whose rotational position indicates different zoom levels or a soft control equivalent).

In the example shown in FIG. 4, in response to receiving the user input (56), processor 16 determines whether the user input is associated with a first level of zoom level (58). Memory 24 of system 10 (FIG. 1) can store one or more parameters defining the zoom level and processor 16 can determine whether the user input is associated with the first level of zoom based on the one or more stored parameters. The user can select a zoom level using a flight deck control.

In some examples, such as that shown in FIG. 4, processor 116 determines whether the user input is associated with a first level of zoom (58) or a second level of zoom. In some examples, the first level of zoom is associated with a 1% to 50% larger scale graphical representation of aircraft 12 than the initial GUI, which may present a baseline graphical representation of aircraft 12, and the second level of zoom is any level of zoom associated with greater than a 50% larger scale view of aircraft 12 than the initial GUI. In response to determining the user input is associated with the first level of zoom ("YES" branch of block 58), processor 16 generates and displays a second GUI including a second graphical representation of aircraft 12 that presents a larger scale view of aircraft 12 relative to the first GUI (60). Thus, in response to the user input, processor 16 generates and displays a second GUI that presents the requested zoomed-in view of aircraft 12.

Figure 5:
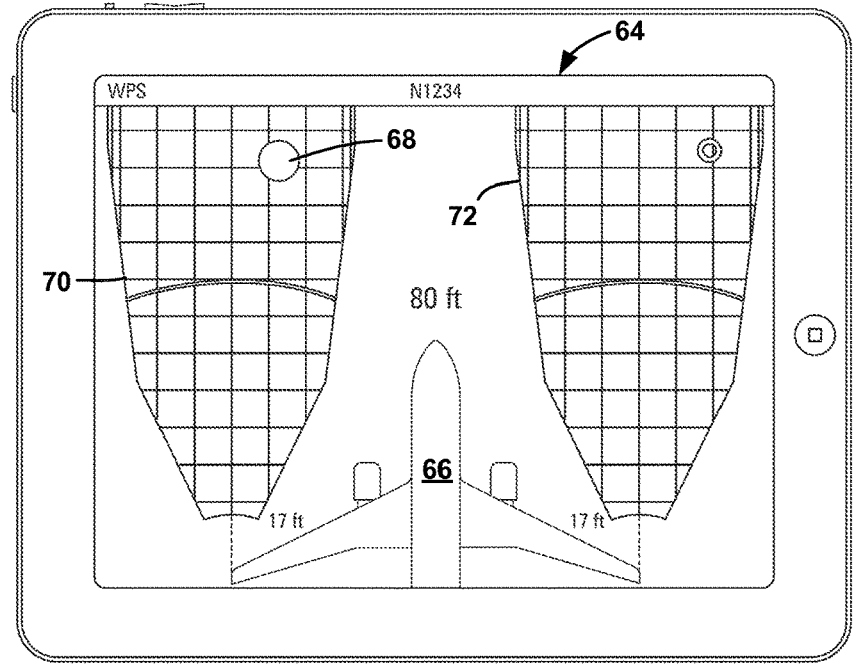
FIG. 5 illustrates an example GUI that includes a zoomed-in view of an aircraft and includes a graphical representation of a detected obstacle.

GUIs 34, 36 (FIGS. 3A and 3B) may be examples of initial GUIs presented by processor 16 prior to receiving user input requesting a zoomed-in view of aircraft 12. FIG. 5 illustrates an example second GUI 64 generated by processor 16 in response to receiving user input associated with the first level of zoom. Although indications of areas of unknown associated with detected obstacles are not shown in FIG. 5, in some examples, GUI 64 can also include an indication of an area of unknown, e.g., area of unknown 42 (FIG. 3A) or area of unknown (48). When processor 16 zooms GUI 34 or 36 to the first level, processor 16 increases the scale of graphical representation of aircraft 38 (FIGS. 3A and 3B) by 1% to 50% thereby resulting in second graphical representation of aircraft 66. In addition, processor 16 increases the scale of detected obstacle 40 (FIGS. 3A and 3B), thereby resulting in the larger scale graphical indication of detected obstacle 68. To generate GUI 64, processor further increases the scale of the displayed distance markers and strike zones 44, 46, thereby resulting in larger scale strike zones 70, 72.

In the example shown in FIG. 5, processor 16 maintains the relative proportions of the displayed Objects 66, 68, 70, 72, such that the same scaling factor is used. If, for example, the zoom level requested by the user is a 200% zoom level, each object 66, 68, 70, 72 is twice as large as the corresponding object of GM 34 or 36. In addition, due to a smaller ground area being shown in GUI 64, processor 16 may show the distance markers of GUI 64 in a half scale range compared to the distance markers of GUIs 34, 36. In other examples, processor 16 can apply different scaling factors to different objects 66, 68, 70, 72.

Second graphical representation of aircraft 66 is displayed in a larger scale than first graphical representation of aircraft 38 illustrated in FIGS. 3A and 3B. As a result, the zoomed-in view of aircraft 66 shown in FIG. 5 occupies a larger portion of the display of user interface 20 and less surrounding ground area is shown in GUI 64. In the example shown in FIG. 5, GUI 64 generated by processor 16 in response to receiving user input associated with the first level of zoom illustrates a graphical representation of aircraft 66 and half the ground area ahead of aircraft 12 (which is defined by the heading of aircraft 12 determined by one or more data sources, ground-based systems 28, or any other source of information). However, the first zoom level results in sufficient ground area being presented in GUI 64 to provide sufficient notification to a user of detected obstacles. The sufficient notification may be, for example, notification provided in enough time for the flight crew to maneuver aircraft 12 to avoid the detected obstacles.

Processor 16 can be configured to provide any suitable levels of zoom. In the technique shown in FIG. 4, processor 16 is configured to provide two levels of zoom. Thus, in response to determining the user input is not associated with the first level of zoom ("NO" branch of block 58), processor 16 determines the user input is associated with a second level of zoom and generates and displays a third GUI that that presents the requested zoomed-in view of aircraft 12 (62). The third GUI may include at least two windows including different graphical representations of aircraft 12 representing different views of aircraft 12. The first window may include, for example, a graphical representation of aircraft 12 that illustrates a zoomed-in view requested by the user via the user input. The second window may include a different graphical representation of aircraft 12 that illustrates a different view than that requested by the user via the user input. As described in further detail below with respect to FIGS. 7A-7C, the second window may help keep the user apprised of obstacles that are off screen in the first window.

Figure 6:
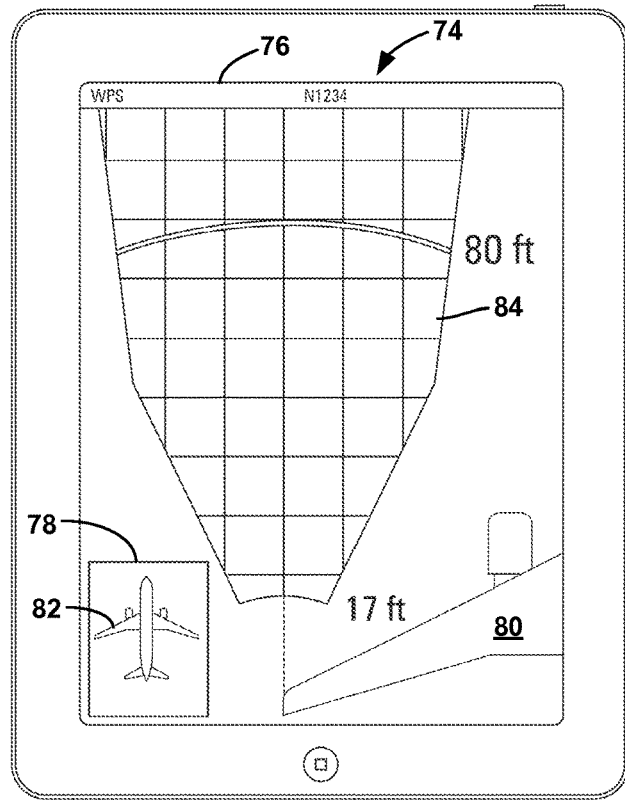
FIG. 6 illustrates an example GUI that includes two windows including different graphical representations of an aircraft representing different views of the aircraft.

An example third GUI 74 is shown in FIG. 6. Third GUI 74 includes first window 76 and second window 78 including different graphical representations of aircraft 12 representing different views of aircraft 12 and different ground areas. Second window 78 presents a view of aircraft 12 that results in more ground area being displayed than in first window 76. In this way, second window 78 presents information that supplements the information regarding obstacles provided by first window 76. A user may view both first and second windows 76, 78, and determine whether an obstacle is proximate aircraft 12 based on the information regarding obstacles presented by both first and second windows 76, 78.

As shown in FIG. 6, in some examples, processor 16 can generate a GUI 74 in which second window 78 is presented in a picture-in-picture format, in which first window 76 is a main window (e.g., occupies the full display screen or nearly the full display screen) and second window 78 is inset in first window 76, In other examples, processor 16 can generate a GUI 74 in which windows 76, 78 are displayed in other formats, such as in a split screen format, in which the windows do not overlap or partially overlap. Windows 76, 78 can have any suitable relative such, such as substantially equal (e.g., equal or nearly equal), or one window can be greater in size than the other.

In the example shown in FIG. 6, first window 76 includes a third graphical representation of aircraft 80 presenting the zoomed-in view of aircraft 12 requested by the user, and second window 78 includes fourth graphical representation of aircraft 82 presenting a different view of aircraft 12 than that shown by the third graphical representation of aircraft 80. In particular, third graphical representation of aircraft 80 presents a larger scale view of aircraft 12 fourth graphical representation 82, as well as first and second graphical representations 38 (FIGS. 3A and 3B) and 66 (FIG. 5).

In the example shown in FIG. 6, third graphical representation of aircraft 80 illustrates only a top plan view of a portion of aircraft 12 (a wing), whereas fourth graphical representation of aircraft 82 illustrates a top plan view of the entire aircraft 12. In other examples, third and fourth graphical representations of aircraft 80, 82 can illustrate any suitable portions of aircraft 12, For example, third graphical representation of aircraft 80 can illustrate a plan view of only a right wing of aircraft 12, and fourth graphical representation of aircraft 82 can illustrate a plan view of only a left wing of aircraft 12. In this example, second window 78 presents a view of aircraft 12 that includes a different ground area than first window 76 and, therefore, supplements the information regarding obstacles provided by first window 76.

Because only a single wing is presented in first window 76 of GUI 74 shown in FIG. 6, GUI 74 only illustrates a single strike zone 84 associated with the displayed wing, rather than two strike zones as in GUIs 34, 36, in which both wings of aircraft 12 are displayed. In addition, when processor 16 generates the second level zoomed-in view of GUI 34 or 36, as shown in FIG. 6, processor 16 increases the scale of graphical representation of aircraft 38 (FIGS. 3A and 3B), thereby resulting in second graphical representation of aircraft 80. In addition, processor 16 increases the scale of the displayed distance markers and strike zone 44, thereby resulting in larger scale strike zone 84.

The zoomed-in view of aircraft 12 shown in first window 76 of GUI 74 only includes a portion of the area surrounding aircraft 12 shown in GUIs 34, 36 (FIGS. 3A and 3B), as well as second GUI 64 (FIG. 5), Because only a limited ground area is shown after applying the second zoom level, it may be beneficial to include second window 78 that depicts additional ground areas proximate aircraft 12. Depicting the additional ground areas in conjunction with zoomed-in view of aircraft in first window 76 may help the user stay apprised of any obstacles (or absence of obstacles) that may be in the ground area proximate aircraft 12 that are not shown in first window 76. The user can visualize obstacles that are off screen in first window 76.

If processor 16 does not detect any obstacles that are located within the ground area illustrated in second window 78, processor 16 may still generate second window 78, but no obstacles may be shown in second window 78. Displaying the absence of obstacles in second window 78 may also provide a user with a more meaningful representation of the ground areas and obstacle-situation proximate other portions of aircraft 12 not shown in first window 76.

Although indications of areas of unknown are not shown in FIG. 6, in some examples, one or both windows 76, 78 of GUI 74 can also include indications of one or more areas of unknown.

Obstacles, aircraft 12, or both, may be moving, such that the relative distance between the obstacle and aircraft 12 may change over time. The obstacles may move in and out of range of the sensors (e.g., radar sensors) with which processor 16 detects obstacles and determines the location of obstacles. Processor 16 is configured to update a currently displayed GUI (e.g., one or more of GUIs 34, 36, 64, or 74) to include a graphical representation of an obstacle that is placed in the GUI at a position that indicates a determined location of the real world obstacle to aircraft 12. Processor 16 can, for example, generate an updated GUI so that detected obstacles appear on the display of system 10 as processor 16 detects the obstacles, e.g., using the technique described with respect to FIG. 2.

Processor 16 can update a displayed GUI at any suitable frequency. In some examples, processor 16 generates and presents an updated GM with an updated location of an obstacle in response to determining the obstacle has moved a certain distance, e.g., from a distance range associated with a primary target, an intermediate target or a secondary target, to a distance range associated with a different one of the primary target, the intermediate target, or the secondary target.

Using GUIs 64, 74 of FIGS. 5 and 6 as an example, in order to generate GUI 64, processor 16 detected an obstacle and generated and displayed GUI 64 including graphical representation of obstacle 68 (FIG. 5), The location of graphical representation of obstacle 68 relative to graphical representation of aircraft 66 shown in GUI 64 indicates the location of the real world obstacle relative to aircraft 12. In the example shown in FIG. 5, graphical representation of obstacle 68 is shown to be greater than 80 feet away from the wings of aircraft 12.

In response to receiving user input requesting a zoomed-in view of GUI 64, processor 16 generates and displays GUI 74 (FIG. 6), In the zoomed-in view, the detected obstacle represented by graphical representation of obstacle 68 in GUI 64, is off screen because of the smaller portion of strike zone 84 displayed by first window 74 of 74. The real world obstacle, aircraft 12, or both, may be moving, such that the relative distance between the obstacle and aircraft 12 may be decreasing. Processor 16 may detect this change in distance based on, for example, a currently determined location of the obstacle. In response to determining the real world obstacle is closer to aircraft 12, e.g., within the portion of strike zone 84 shown in first window 76, processor 16 can update GUI 74 to include a graphical representation of the obstacle in first window 76.

Figure 7A:
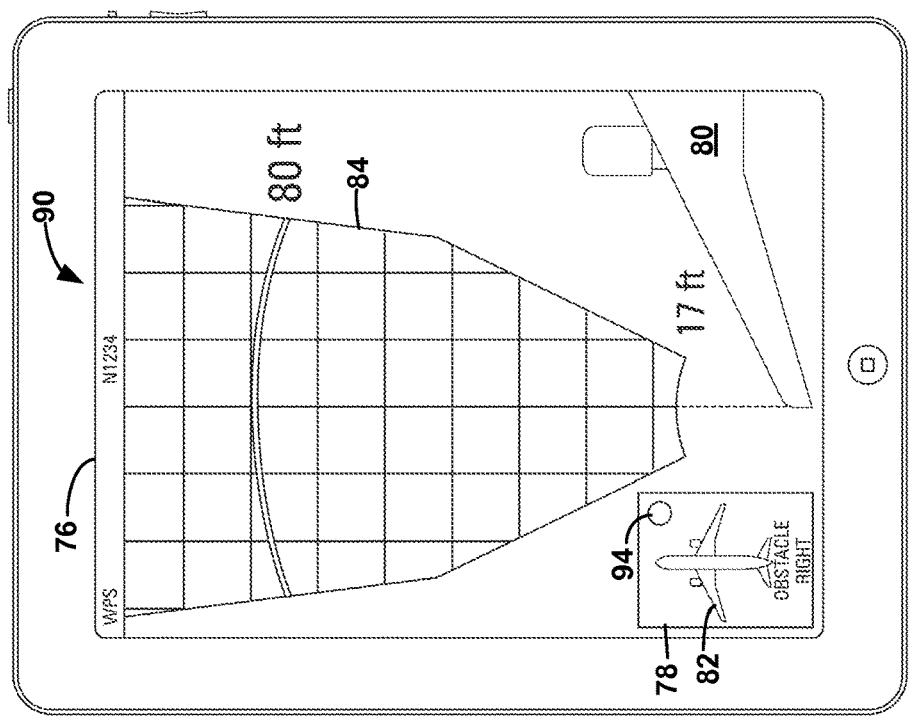
FIGS. 7A-7C illustrate example GUIs that each include two windows including different graphical representations of an aircraft representing different views of the aircraft.
Figure 7B:
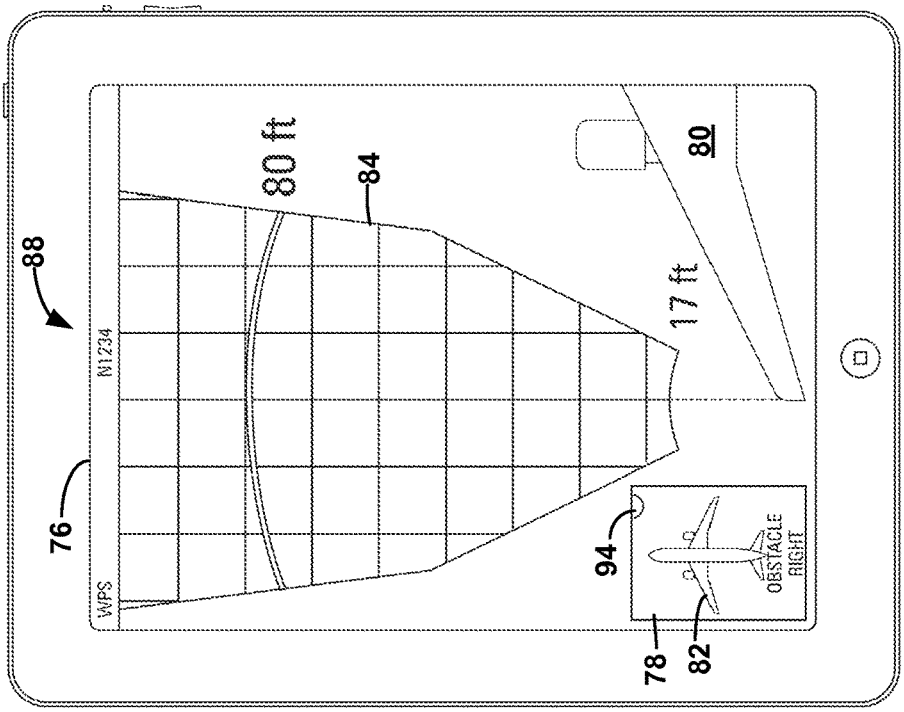
Figure 7C:
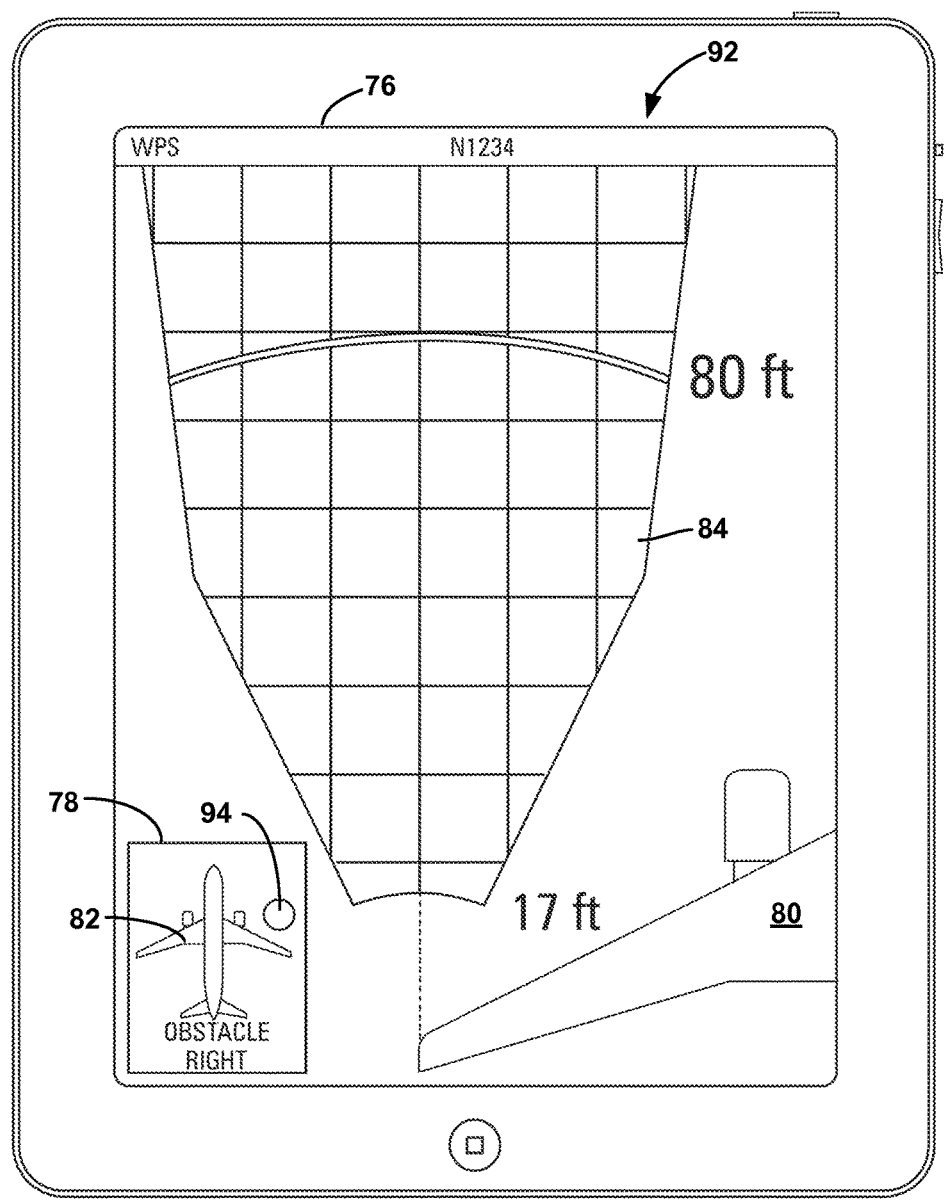

Examples of updated GUIs 88, 90, 92, are shown in FIGS. 7A-7C, respectively, which are examples of GUIs generated by processor 16 after updating 74 to include a graphical representation of a detected obstacle 94 that was not detected when GUI 74 was generated or was not within the ground area depicted in GUI 74 of FIG. 6. GUIS 88, 90, 92 may represent sequential GUIs generated by processor 16 over time to indicate an updated location of a detected obstacle. In FIGS. 7A-7C, processor 16 determines that the obstacle is moving closer to a right wing of aircraft 12, such that each subsequent GUI 88, 90, 92 generated after generating GUI 74 illustrates graphical representation of obstacle 94 closer to the right wing of the graphical representation of aircraft 82 in second window 78.

As discussed above, zoomed-in view of aircraft 12 shown in first window 76 only depicts a portion of the area surrounding aircraft 12, and, in particular, the ground area in front of a left wing of aircraft 12. Second window 78 depicts additional ground areas proximate aircraft 12, and, in the examples shown in FIGS. 6-7C, depicts not only the ground area in a strike zone of the left wing of aircraft 12, but also depicts the ground area in a strike zone of the right wing of aircraft 12. The right wing is not shown in first window 76, such that obstacle 94 is not within the ground area shown in first window 76. Thus, although the user requested a zoomed-in view of the left wing of aircraft 12, which is shown in first window 76, processor 16 provides additional information indicating Obstacles that may be proximate to other portions of aircraft 12 via second window 78. In this way, GUIs 74, 88, 90, and 92 help enhance user awareness of obstacles proximate aircraft 12, particularly relative to a GUI that only illustrates only a single view of aircraft 12 (e.g., a GUI that illustrates only the view shown by first window 76).

In some examples, processor 16 can provide additional information regarding a detected target via second window 78. For example, processor 16 can generate a graphical representation of obstacle 94 with one or more characteristics (e.g., visible indicia) that indicate a relative distance between the detected obstacle and the aircraft. In the example shown in FIG. 7A, for example, graphical representation of obstacle 94 may be a color that indicates the detected obstacle is a primary target. As discussed above, memory 24 of system 10 can store a code that associates a plurality of predetermined colors (or other visible indicia) with respective target statuses, and processor 16 can select the color (or other visible indicia) for graphical representation of obstacle 94 based on the information stored by memory 24.

In addition to, or instead of the color of obstacle, in some examples, processor 16 can generate graphical representation of obstacle 94 having a particular shape that is associated with a particular distance range to aircraft 12 or a structure of aircraft (e.g., a wing or wing tip). Memory 24 of system 10 can store a code that associates a plurality of predetermined shapes with respective distance ranges, and processor 16 can select the shape for graphical representation of obstacle 94 based on the information stored by memory 24. In FIG. 7A, graphical representation of obstacle 94 has a half circle shape, which may indicate the detected obstacle is greater than 160 feet in front of aircraft 12. In FIGS. 7B and 7C, graphical representation of obstacle 94 has a circular shape, which may indicate the detected obstacle is less than 160 feet from the aircraft.

In some examples, processor 16 generates GUIs 88, 90, 92 such that graphical representation of obstacle 94 is positioned in window 78 in a manner that accurately represents the true bearing and distance of the real world obstacle to aircraft 12. However, in some examples, positioning graphical representation of obstacle 74 relative to graphical representation of aircraft 82 to show that the true bearing and distance to graphical representation of aircraft 12 may not be practical or possible due to the size of second window 78, the scale of aircraft 12 shown in window 78, or both. Thus, in some examples, processor 16 is configured to position graphical representation of obstacle 94 in only a predetermined number of positions within window 78.

For example, processor 16 can be configured to position graphical representation of obstacle 94 in one of three positions within window 78, each position corresponding to a respective distance range. The distance ranges may be, for example, the distance ranges used by processor 16 to determine whether a detected obstacle is a primary, an intermediate, or a secondary obstacle. In FIG. 7A, for example, graphical representation of obstacle 94 is shown at a first position that is a first fixed distance from the right wing of graphical representation of aircraft 82, towards the top of window 78, along an edge of window 78 furthest from graphical representation of aircraft 82, Processor 16 may select the first position for graphical representation of obstacle 94 in response to determining the detected obstacle is greater than a first threshold distance (e.g., about 160 feet) away from the right wing.

In FIG. 7B, graphical representation of obstacle 94 is shown at a second position that is a second fixed distance from the right wing of graphical representation of aircraft 82. In FIG. 7C, graphical representation of obstacle 94 is shown at a third position that is a third fixed distance from the right wing of graphical representation of aircraft 82. Processor 16 may select the third position for graphical representation of obstacle 94 in response to determining the detected obstacle is less than a second threshold distance (e.g., about 80 feet) away from the right wing. Processor 16 may select the second position for graphical representation of obstacle 94 in response to determining the detected obstacle is less than or equal to the first threshold distance, but greater than or equal to the second threshold distance.

In other examples, processor 16 can use any suitable technique for selecting a position for graphical representation of obstacle 94 within second window 78. In addition, any of the techniques for positioning graphical representation of obstacle 94 in window 78 may be used alone or in combination with each other.

Due to the relatively small size of window 78 and the scale of aircraft 12 shown in window 78, distance markers in window 78 may not be a useful tool for a user to gauge the relative distance between aircraft 12 and the detected obstacle, The distance markers may be, for example, too small and a user may not be able to view second window 78 and relatively quickly ascertain the relative distance between aircraft 12 and the detected obstacle using the distance markers.

As another example, as shown in FIGS. 7A-7C, processor 16 can present information regarding the location of the detected obstacle, such as an alphanumeric indication of the side of aircraft 12 on which the obstacle was detected. In the example shown in FIGS. 7A-7C, second windows 78 include "OBSTACLE RIGHT" text that indicates the detected obstacle is on a right side of aircraft 12. Other information can also be used. For example, GUIs 88, 90, 92 can include a textual indication or a visual indication (e.g., color-coding) of a determined distance of a detected obstacle to aircraft 12 or a determined threat level.

Although FIGS. 6-7C illustrate GUIs each including two windows that illustrate different views of aircraft 12, in other examples, processor 16 can generate a GUI including any suitable number of windows e.g., three, four, or more windows) that illustrate different views of aircraft 12.

In other examples of the technique shown in FIG. 4, processor 16 generates and displays a GUI including a plurality of windows (e.g., first and second windows 76, 78, or another set of a windows that includes a main window and one more additional windows) that present different views of aircraft in response to detecting an obstacle in the vicinity of aircraft 12 (e.g., proximate a wing) not shown in main window. In this example, until processor 16 detects an obstacle that is off screen (for main window 76), processor 16 only generates and displays a single window (also referred to herein as the "main window") illustrating the zoomed-in view of aircraft 12 requested by the user (e.g., first window 76). In response to detecting an obstacle that does not fall within the ground area shown in the main window, processor 16 generates and displays a GUI that includes a main window and one or more additional windows representing different views of aircraft 12, where at least one of the one or more additional windows includes a graphical representation of the detected target.

After generating and displaying the GUI that includes a main window and one or more additional windows, processor 16 can continue displaying the GUI including the plurality of windows until processor 16 determines that the detected obstacle at a location that is no longer shown in the one or more additional windows (i.e., "off screen"), until processor 16 determines that the detected obstacle is at a location that is shown in the main window, such that a graphical representation of the obstacle can be shown in the main window, or any combination thereof.

The techniques of this disclosure may be implemented in a wide variety of computer devices. Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

What is claimed is:

1. A method comprising:
    determining, by a processor, a location of an obstacle relative to an aircraft based on received information; and
    generating, by the processor, a graphical user interface based on the location of the obstacle, the graphical user interface comprising a graphical representation of the aircraft, a graphical representation of the obstacle, and an indication of an area of unknown associated with the obstacle, the indication of the area of unknown comprising a graphical object positioned on an opposite side of the graphical representation of the obstacle from the graphical representation of the aircraft, wherein the area of unknown comprises an area for which the processor is unable to determine the presence or absence of obstacles based on the received information.

2. The method of claim 1, further comprising presenting, by the processor, the graphical user interface via a display.

3. The method of claim 1, wherein the graphical object increases in width in a direction away from the graphical representation of the obstacle.

4. The method of claim 1, wherein generating the graphical user interface comprises:
    determining, by the processor, a threat level of at least one of the obstacle or the area of unknown based on a distance between the at least one of the obstacle or the area of unknown and the aircraft; and
    generating, by the processor, at least one of the graphical representation of the obstacle or the indication of the area of unknown to include a characteristic that represents the determined threat level of the at least one of the obstacle or the area of unknown.

5. The method of claim 1, wherein the graphical user interface comprises a first graphical user interface comprising a first graphical representation of the aircraft, the method further comprising:
    receiving, by the processor, user input requesting a different view of the aircraft; and
    in response to receiving the user input, generating, by the processor, a second graphical user interface comprising a second graphical representation of the aircraft, the second graphical representation of the aircraft presenting the different view of the aircraft.

6. The method of claim 1, wherein the area of unknown comprises a two-dimensional ground area or a volume of space that the obstacle blocks from a view of a sensor onboard the aircraft.

7. The method of claim 1, wherein determining the location of the obstacle relative to the aircraft comprises determining the location of a ground obstacle relative to the aircraft while the aircraft is on the ground, and wherein the indication of the area of unknown is associated with the ground obstacle.

8. A system comprising:
    a display; and
    a processor configured to receive information indicative of a location of an obstacle, determine the location of the obstacle relative to an aircraft based on the received information, generate a graphical user interface based on the location of the obstacle, the graphical user interface comprising a graphical representation of the aircraft, a graphical representation of the obstacle, and an indication of an area of unknown associated with the obstacle, the indication of the area of unknown comprising a graphical object positioned on an opposite side of the graphical representation of the obstacle from the graphical representation of the aircraft, wherein the area of unknown comprises an area for which the processor is unable to determine the presence or absence of obstacles based on the received information, and present the graphical user interface via the display.

9. The system of claim 8, wherein the graphical user interface comprises the graphical representation of the obstacle positioned relative to the graphical representation of the aircraft to indicate the relative distance and angular position of the obstacle relative to the aircraft.

10. The system of claim 8, wherein the graphical object increases in width in a direction away from the graphical representation of the obstacle.

11. The system of claim 8, further comprising a sensor configured to generate the information indicative of the location of the obstacle.

12. The system of claim 8, wherein the processor is configured to generate the graphical user interface by at least determining a threat level of at least one of the obstacle or the area of unknown based on a distance between the at least one of the obstacle or the area of unknown and the aircraft, and generate at least one of the graphical representation of the obstacle or the indication of the area of unknown to include a characteristic that represents the determined threat level of the at least one of the obstacle or the area of unknown.

13. The system of claim 12, wherein the characteristic comprises at least one of a color, a line pattern, or a shading associated with the threat level.

14. The system of claim 8, wherein the graphical user interface comprises a first graphical user interface comprising a first graphical representation of the aircraft, the system further comprising a user interface, wherein the processor is configured to receive, via the user interface, user input requesting a different view of the aircraft, and, in response to receiving the user input, generate a second graphical user interface comprising a second graphical representation of the aircraft, the second graphical representation of the aircraft presenting the different view of the aircraft.

15. The system of claim 8, further comprising a sensor onboard the aircraft, wherein the area of unknown comprises a two-dimensional ground area or a volume of space that the obstacle blocks from a view of the sensor.

16. The system of claim 8, wherein the processor is configured to determine the location of the obstacle relative to the aircraft by at least determining the location of a ground obstacle relative to the aircraft while the aircraft is on the ground, and wherein the indication of the area of unknown is associated with the ground obstacle.

17. A non-transitory computer-readable medium comprising instructions that, when executed by a processor, cause the processor to:
determine, based on received information, a location of an obstacle relative to an aircraft; and
generate a graphical user interface based on the location of the obstacle, the graphical user interface comprising a graphical representation of the aircraft, a graphical representation of the obstacle, and an indication of an area of unknown associated with the obstacle, the indication of the area of unknown comprising a graphical object positioned on an opposite side of the graphical representation of the obstacle from the graphical representation of the aircraft, wherein the area of unknown comprises an area for which the processor is unable to determine the presence or absence of obstacles based on the received information.

18. The non-transitory computer-readable medium of claim 17, wherein the instructions, when executed by the processor, cause the processor to generate the graphical user interface by at least determining a threat level of at least one of the obstacle or the area of unknown based on a distance between the at least one of the obstacle or the area of unknown and the aircraft, and generate at least one of the graphical representation of the obstacle or the indication of the area of unknown to include a characteristic that represents the determined threat level of the at least one of the obstacle or the area of unknown.

19. A method comprising:
determining, by a processor, a location of an obstacle relative to an aircraft based on received information; and
generating, by the processor, a graphical user interface based on the location of the obstacle, the graphical user interface comprising a graphical representation of the aircraft, a graphical representation of the obstacle, and an indication of an area of unknown associated with the obstacle, the indication of the area of unknown comprising a graphical object that increases in width in a direction away from the graphical representation of the obstacle and from the graphical representation of the aircraft, wherein the area of unknown comprises an area for which the processor is unable to determine the presence or absence of obstacles based on the received information.

20. A system comprising:
a display; and
a processor configured to receive information indicative of a location of an obstacle, determine the location of the obstacle relative to an aircraft based on the received information, generate a graphical user interface based on the location of the obstacle, the graphical user interface comprising a graphical representation of the aircraft, a graphical representation of the obstacle, and an indication of an area of unknown associated with the obstacle, the indication of the area of unknown comprising a graphical object that increases in width in a direction away from the graphical representation of the obstacle and from the graphical representation of the aircraft, wherein the area of unknown comprises an area for which the processor is unable to determine the presence or absence of obstacles based on the received information, and present the graphical user interface via the display.

* * * * *

UNITED STATES PATENT AND TRADEMARK OFFICE
CERTIFICATE OF CORRECTION

| | | |
|---|---|---|
| PATENT NO. | : 10,431,105 B2 | Page 1 of 1 |
| APPLICATION NO. | : 14/149619 | |
| DATED | : October 1, 2019 | |
| INVENTOR(S) | : Mannon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 700 days.

Signed and Sealed this
Second Day of June, 2020

Andrei Iancu
*Director of the United States Patent and Trademark Office*